US007635082B2

(12) United States Patent
Jones

(10) Patent No.: US 7,635,082 B2
(45) Date of Patent: Dec. 22, 2009

(54) CURRENCY DISPENSER

(75) Inventor: John E. Jones, Winnetka, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 1055 days.

(21) Appl. No.: 10/773,827

(22) Filed: Feb. 6, 2004

(65) Prior Publication Data

US 2004/0154964 A1 Aug. 12, 2004

Related U.S. Application Data

(60) Provisional application No. 60/445,656, filed on Feb. 7, 2003.

(51) Int. Cl.
*G06Q 40/00* (2006.01)

(52) U.S. Cl. .................................................... 235/379

(58) Field of Classification Search ................. 235/379; 902/8–22

See application file for complete search history.

(56) References Cited

U.S. PATENT DOCUMENTS 3,795,343 A 3/1974 Shigemori et al.
3,806,710 A 4/1974 Shigemori et al.
3,914,579 A 10/1975 Shigemori et al.
3,958,583 A 5/1976 Shigemori et al.
4,188,962 A 2/1980 Onoe et al.
4,365,700 A 12/1982 Arimoto et al.
4,434,359 A * 2/1984 Watanabe ................... 235/379
4,625,870 A 12/1986 Nao et al.
4,820,909 A 4/1989 Kawauchi et al.
4,980,543 A 12/1990 Hara et al.
5,163,672 A 11/1992 Mennie ...................... 271/187
5,186,334 A 2/1993 Fukudome et al.
5,207,788 A 5/1993 Geib et al. .................. 271/122
5,295,196 A 3/1994 Raterman et al. ........... 382/135
5,467,405 A 11/1995 Raterman et al. ........... 382/135
5,467,406 A 11/1995 Graves et al. ............... 382/135
D369,984 S 5/1996 Larsen ........................ D10/97
5,633,949 A 5/1997 Graves et al. ............... 382/135

(Continued)

FOREIGN PATENT DOCUMENTS

WO WO 91/11778 8/1991

(Continued)

OTHER PUBLICATIONS

U.S. Appl. No. 60/445,656, filed Feb. 7, 2003.

(Continued)

*Primary Examiner*—Daniel A Hess
(74) *Attorney, Agent, or Firm*—Nixon Peabody LLP

(57) ABSTRACT

A vertically arranged combination desktop currency denominating machine and currency dispenser comprising a currency denominating module adapted to receive a stack of currency bills to be denominated and to denominate the received currency bills, wherein a transport mechanism transports bills individually from an input receptacle adapted to receive the stack of currency bills to one or more output receptacles. The combination further comprising a dispenser retaining section adapted to store currency bills to be dispensed to the one or more output receptacles during a dispensing operation, the retaining section comprising one or more dispensing receptacles, each dispensing receptacle adapted to hold bills having a common denomination, wherein the dispenser retainer section is positioned above the currency denominating module.

3 Claims, 11 Drawing Sheets

U.S. PATENT DOCUMENTS

| | | | | |
|---|---|---|---|---|
| 5,640,463 | A | 6/1997 | Csulits | 382/135 |
| 5,652,802 | A | 7/1997 | Graves et al. | 382/135 |
| 5,680,472 | A | 10/1997 | Conant | |
| 5,687,963 | A | 11/1997 | Mennie | 271/119 |
| 5,692,067 | A | 11/1997 | Raterman et al. | 382/135 |
| 5,704,491 | A | 1/1998 | Graves | 209/534 |
| 5,724,438 | A | 3/1998 | Graves | 382/135 |
| 5,751,840 | A | 5/1998 | Raterman et al. | 382/135 |
| 5,790,693 | A | 8/1998 | Graves et al. | 382/135 |
| 5,790,697 | A | 8/1998 | Munro et al. | 382/135 |
| 5,806,650 | A | 9/1998 | Mennie et al. | 194/206 |
| 5,815,592 | A | 9/1998 | Mennie et al. | 382/135 |
| 5,822,448 | A | 10/1998 | Graves et al. | 382/135 |
| 5,832,104 | A | 11/1998 | Graves et al. | 382/135 |
| 5,867,589 | A | 2/1999 | Graves et al. | 382/135 |
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,938,044 | A | 8/1999 | Weggesser | 209/534 |
| 5,943,655 | A | 8/1999 | Jacobson | 705/30 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,006,989 | A | 12/1999 | Ademmer et al. | |
| 6,012,565 | A | 1/2000 | Mazur | 194/207 |
| 6,021,883 | A | 2/2000 | Casanova et al. | 194/217 |
| 6,026,175 | A | 2/2000 | Munro et al. | 382/135 |
| 6,028,951 | A | 2/2000 | Raterman et al. | 382/135 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,109,522 | A * | 8/2000 | Force et al. | 235/379 |
| 6,128,402 | A | 10/2000 | Jones et al. | 382/135 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,311,819 | B1 | 11/2001 | Stromme et al. | 194/207 |
| 6,318,537 | B1 | 11/2001 | Jones et al. | 194/346 |
| 6,351,551 | B1 | 2/2002 | Munro et al. | 382/135 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,459,806 | B1 | 10/2002 | Raterman et al. | 382/135 |
| 6,460,705 | B1 | 10/2002 | Hallowell | 209/534 |
| 6,493,461 | B1 | 12/2002 | Mennie et al. | 382/135 |
| 6,539,104 | B1 | 3/2003 | Raterman et al. | 382/135 |
| 6,560,355 | B2 | 5/2003 | Graves et al. | 382/135 |
| 6,573,983 | B1 * | 6/2003 | Laskowski | 356/71 |
| 6,588,569 | B1 | 7/2003 | Jenrick et al. | 194/206 |
| 6,601,687 | B1 | 8/2003 | Jenrick et al. | 194/206 |
| 6,603,872 | B2 | 8/2003 | Jones et al. | 382/135 |
| 6,621,919 | B2 | 9/2003 | Mennie et al. | 382/135 |
| 6,628,816 | B2 | 9/2003 | Mennie et al. | 382/135 |
| 6,636,624 | B2 | 10/2003 | Raterman et al. | 382/135 |
| 6,647,136 | B2 | 11/2003 | Jones et al. | 382/137 |
| 6,650,767 | B2 | 11/2003 | Jones et al. | 382/135 |
| 6,654,486 | B2 | 11/2003 | Jones et al. | 382/135 |
| 6,661,910 | B2 | 12/2003 | Jones et al. | 382/135 |
| 6,665,431 | B2 | 12/2003 | Jones et al. | 382/135 |
| 6,678,401 | B2 | 1/2004 | Jones et al. | 382/135 |
| 6,678,402 | B2 | 1/2004 | Jones et al. | 382/135 |
| 6,705,470 | B2 | 3/2004 | Klein et al. | 209/534 |
| 6,721,442 | B1 | 4/2004 | Mennie et al. | 382/135 |
| 6,724,926 | B2 | 4/2004 | Jones et al. | 382/135 |
| 6,724,927 | B2 | 4/2004 | Jones et al. | 382/135 |
| 6,731,785 | B1 | 5/2004 | Mennie et al. | 382/135 |
| 6,731,786 | B2 | 5/2004 | Jones et al. | 382/135 |
| 6,748,101 | B1 | 6/2004 | Jones et al. | 382/135 |
| 6,778,693 | B2 | 8/2004 | Munro et al. | 382/135 |
| 6,798,899 | B2 | 9/2004 | Mennie et al. | 382/135 |
| 6,810,137 | B2 | 10/2004 | Jones et al. | 382/135 |
| 6,843,418 | B2 | 1/2005 | Jones et al. | 235/462.01 |
| 6,860,375 | B2 | 3/2005 | Hallowell et al. | 194/328 |
| 6,866,134 | B2 | 3/2005 | Stromme et al. | 194/207 |
| 6,868,954 | B2 | 3/2005 | Stromme et al. | 194/207 |
| 6,880,692 | B1 | 4/2005 | Mazur et al. | 194/207 |
| 6,913,130 | B1 | 7/2005 | Mazur et al. | 194/207 |
| 6,913,260 | B2 | 7/2005 | Maier et al. | 271/265.04 |
| 6,915,893 | B2 | 7/2005 | Mennie | 194/207 |
| 6,929,109 | B1 | 8/2005 | Klein et al. | 194/206 |
| 6,955,253 | B1 | 10/2005 | Mazur et al. | 194/207 |
| 6,957,733 | B2 | 10/2005 | Mazur et al. | 194/215 |
| 6,959,800 | B1 | 11/2005 | Mazur et al. | 194/207 |
| 6,962,247 | B2 | 11/2005 | Maier et al. | 194/207 |
| 6,980,684 | B1 | 12/2005 | Munro et al. | 382/135 |
| 6,994,200 | B2 | 2/2006 | Jenrick et al. | 194/206 |
| 6,996,263 | B2 | 2/2006 | Jones et al. | 382/135 |
| 7,000,828 | B2 | 2/2006 | Jones | 235/379 |
| 7,016,767 | B2 | 3/2006 | Jones et al. | 700/224 |
| 7,082,216 | B2 | 7/2006 | Jones et al. | 382/137 |
| 7,092,560 | B2 | 8/2006 | Jones et al. | 382/135 |
| 7,103,206 | B2 | 9/2006 | Graves et al. | 382/135 |
| 7,103,438 | B2 | 9/2006 | Hallowell et al. | 700/116 |
| 7,146,245 | B2 | 12/2006 | Jones et al. | 700/224 |
| 7,149,336 | B2 | 12/2006 | Jones et al. | 382/135 |
| 7,158,662 | B2 | 1/2007 | Chiles | 382/135 |
| 7,171,032 | B2 | 1/2007 | Jones et al. | 382/135 |
| 7,187,795 | B2 | 3/2007 | Jones et al. | 382/135 |
| 7,191,657 | B2 | 3/2007 | Maier et al. | 73/587 |
| 7,197,173 | B2 | 3/2007 | Jones et al. | 382/135 |
| 7,200,255 | B2 | 4/2007 | Jones et al. | 382/135 |
| 7,201,320 | B2 | 4/2007 | Csulits et al. | 235/462.01 |
| 7,232,024 | B2 | 6/2007 | Mazur et al. | 194/207 |
| 7,248,731 | B2 | 7/2007 | Raterman et al. | 382/135 |
| 7,256,874 | B2 | 8/2007 | Csulits et al. | 356/71 |
| 7,269,279 | B2 | 9/2007 | Chiles | 382/135 |
| 2001/0006557 | A1 | 7/2001 | Mennie et al. | 382/135 |
| 2001/0015311 | A1 | 8/2001 | Mennie | 194/207 |
| 2001/0019624 | A1 | 9/2001 | Raterman et al. | 382/135 |
| 2001/0035603 | A1 | 11/2001 | Graves et al. | 271/265.01 |
| 2002/0001393 | A1 | 1/2002 | Jones et al. | 382/100 |
| 2002/0020603 | A1 | 2/2002 | Jones et al. | 194/346 |
| 2002/0056605 | A1 | 5/2002 | Mazur et al. | 194/207 |
| 2002/0085245 | A1 | 7/2002 | Mennie et al. | 358/498 |
| 2002/0085745 | A1 | 7/2002 | Jones et al. | 382/135 |
| 2002/0103757 | A1 | 8/2002 | Jones et al. | 705/45 |
| 2002/0104785 | A1 | 8/2002 | Klein et al. | 209/534 |
| 2002/0107801 | A1 | 8/2002 | Jones et al. | 705/45 |
| 2002/0118871 | A1 | 8/2002 | Jones et al. | 382/137 |
| 2002/0122580 | A1 | 9/2002 | Jones et al. | 382/137 |
| 2002/0126885 | A1 | 9/2002 | Mennie et al. | 382/135 |
| 2002/0126886 | A1 | 9/2002 | Jones et al. | 382/135 |
| 2002/0131630 | A1 | 9/2002 | Jones et al. | 382/137 |
| 2002/0136442 | A1 | 9/2002 | Jones et al. | 382/135 |
| 2002/0145035 | A1 | 10/2002 | Jones | 235/379 |
| 2002/0154804 | A1 | 10/2002 | Jones et al. | 382/135 |
| 2002/0154805 | A1 | 10/2002 | Jones et al. | 382/135 |
| 2002/0154806 | A1 | 10/2002 | Jones et al. | 382/135 |
| 2002/0154807 | A1 | 10/2002 | Jones et al. | 382/135 |
| 2002/0154808 | A1 | 10/2002 | Jones et al. | 382/135 |
| 2002/0186876 | A1 | 12/2002 | Jones et al. | 382/135 |
| 2003/0009420 | A1 | 1/2003 | Jones | 705/39 |
| 2003/0015395 | A1 | 1/2003 | Hallowell et al. | 194/206 |
| 2003/0015396 | A1 | 1/2003 | Mennie | 194/206 |
| 2003/0059098 | A1 | 3/2003 | Jones et al. | 382/135 |

| | | | | |
|---|---|---|---|---|
| 2003/0062242 | A1 | 4/2003 | Hallowell et al. | 194/302 |
| 2003/0081824 | A1 | 5/2003 | Mennie et al. | 382/135 |
| 2003/0108233 | A1 | 6/2003 | Raterman et al. | 382/135 |
| 2003/0121752 | A1 | 7/2003 | Stromme et al. | 194/207 |
| 2003/0121753 | A1 | 7/2003 | Stromme et al. | 194/207 |
| 2003/0132281 | A1 | 7/2003 | Jones et al. | 235/379 |
| 2003/0139994 | A1 | 7/2003 | Jones | 705/36 |
| 2003/0168308 | A1 | 9/2003 | Maier et al. | 194/207 |
| 2003/0174874 | A1 | 9/2003 | Raterman et al. | 382/135 |
| 2003/0182217 | A1 | 9/2003 | Chiles | 705/35 |
| 2003/0198373 | A1 | 10/2003 | Raterman et al. | 382/135 |
| 2003/0202690 | A1 | 10/2003 | Jones et al. | 382/139 |
| 2004/0003980 | A1 | 1/2004 | Hallowell et al. | 194/206 |
| 2004/0016621 | A1 | 1/2004 | Jenrick et al. | 194/206 |
| 2004/0016797 | A1 | 1/2004 | Jones et al. | 235/379 |
| 2004/0028266 | A1 | 2/2004 | Jones et al. | 382/135 |
| 2004/0083149 | A1 | 4/2004 | Jones | 705/35 |
| 2004/0145726 | A1 | 7/2004 | Csulits et al. | 356/71 |
| 2004/0149538 | A1 | 8/2004 | Sakowski | 194/207 |
| 2004/0153408 | A1 | 8/2004 | Jones et al. | 705/43 |
| 2004/0154964 | A1 | 8/2004 | Jones | 209/534 |
| 2004/0173432 | A1 | 9/2004 | Jones | 194/216 |
| 2004/0251110 | A1 | 12/2004 | Jenrick et al. | 194/207 |
| 2005/0029168 | A1 | 2/2005 | Jones et al. | 209/534 |
| 2005/0035034 | A1 | 2/2005 | Long et al. | 209/534 |
| 2005/0040225 | A1 | 2/2005 | Csulits et al. | 235/379 |
| 2005/0047642 | A1 | 3/2005 | Jones et al. | 382/137 |
| 2005/0060055 | A1 | 3/2005 | Hallowell et al. | 700/95 |
| 2005/0060059 | A1 | 3/2005 | Klein et al. | 700/213 |
| 2005/0060061 | A1 | 3/2005 | Jones | 700/226 |
| 2005/0077142 | A1 | 4/2005 | Tam et al. | 194/217 |
| 2005/0086271 | A1 | 4/2005 | Jones et al. | 707/200 |
| 2005/0087422 | A1 | 4/2005 | Maier et al. | 194/207 |
| 2005/0108165 | A1 | 5/2005 | Jones et al. | 705/43 |
| 2005/0117791 | A2 | 6/2005 | Raterman et al. | 382/135 |
| 2005/0117792 | A2 | 6/2005 | Graves et al. | 382/135 |
| 2005/0150738 | A1 | 7/2005 | Hallowell et al. | 194/206 |
| 2005/0163361 | A1 | 7/2005 | Jones et al. | 382/135 |
| 2005/0163362 | A1 | 7/2005 | Jones et al. | 382/137 |
| 2005/0169511 | A1 | 8/2005 | Jones | 382/135 |
| 2005/0173221 | A1 | 8/2005 | Maier et al. | 194/207 |
| 2005/0183928 | A1 | 8/2005 | Jones et al. | 194/207 |
| 2005/0207634 | A1 | 9/2005 | Jones et al. | 382/135 |
| 2005/0213803 | A1 | 9/2005 | Mennie et al. | 382/135 |
| 2005/0241909 | A1 | 11/2005 | Mazur et al. | 194/207 |
| 2005/0249394 | A1 | 11/2005 | Jones et al. | 382/135 |
| 2005/0265591 | A1 | 12/2005 | Jones et al. | 382/135 |
| 2005/0276458 | A1 | 12/2005 | Jones et al. | 382/135 |
| 2005/0278239 | A1 | 12/2005 | Jones et al. | 705/35 |
| 2006/0010071 | A1 | 1/2006 | Jones et al. | 705/42 |
| 2006/0054455 | A1 | 3/2006 | Kuykendall et al. | 194/217 |
| 2006/0078186 | A1 | 4/2006 | Freeman et al. | 382/135 |
| 2006/0182330 | A1 | 8/2006 | Chiles | 382/135 |
| 2006/0195567 | A1 | 8/2006 | Mody et al. | 709/224 |
| 2006/0210137 | A1 | 9/2006 | Raterman et al. | 382/135 |
| 2006/0274929 | A1 | 12/2006 | Jones et al. | 382/135 |
| 2007/0076939 | A1 | 4/2007 | Jones et al. | 382/135 |
| 2007/0078560 | A1 | 4/2007 | Jones et al. | 700/224 |
| 2007/0095630 | A1 | 5/2007 | Mennie et al. | 194/206 |
| 2007/0112674 | A1 | 5/2007 | Jones | 705/45 |
| 2007/0122023 | A1 | 5/2007 | Jenrick et al. | 382/135 |
| 2007/0172107 | A1 | 7/2007 | Jones et al. | 382/137 |

FOREIGN PATENT DOCUMENTS

| | | | |
|---|---|---|---|
| WO | WO 92/17394 | | 10/1992 |
| WO | WO 93/23824 | | 11/1993 |
| WO | WO 95/24691 | | 9/1995 |
| WO | WO 96/10800 | | 4/1996 |
| WO | WO 96/36933 | | 11/1996 |
| WO | WO 97/30422 | | 8/1997 |
| WO | WO 97/43734 | | 11/1997 |
| WO | WO 97/45810 | | 12/1997 |
| WO | WO 98/12662 | | 3/1998 |
| WO | WO 98/13785 | | 4/1998 |
| WO | WO 98/24052 | | 6/1998 |
| WO | WO 98/24067 | | 6/1998 |
| WO | WO 98/35323 | | 8/1998 |
| WO | WO 98/40839 | | 9/1998 |
| WO | WO 98/47100 | | 10/1998 |
| WO | WO 98/50892 | | 11/1998 |
| WO | WO 98/59323 | | 12/1998 |
| WO | WO 99/09511 | | 2/1999 |
| WO | WO 99/14668 | | 3/1999 |
| WO | WO 99/23601 | | 5/1999 |
| WO | WO 99/41695 | | 8/1999 |
| WO | WO 99/48040 | | 9/1999 |
| WO | WO 99/48042 | | 9/1999 |
| WO | WO 00/24572 | | 5/2000 |
| WO | WO 01/08108 | | 2/2001 |
| WO | WO 01/59685 | | 8/2001 |
| WO | WO 01/59723 | | 8/2001 |
| WO | WO 02/29735 | | 4/2002 |
| WO | WO 02/054360 | | 7/2002 |
| WO | WO 03/005312 | | 1/2003 |
| WO | WO 03/028361 | | 4/2003 |
| WO | WO 03/029913 | | 4/2003 |
| WO | WO 03/030113 | | 4/2003 |
| WO | WO 03/067532 | | 8/2003 |
| WO | WO 03/107282 | | 12/2003 |
| WO | WO 2004/010367 | | 1/2004 |
| WO | WO 2004/027717 | | 4/2004 |
| WO | WO 2004/036508 | | 4/2004 |
| WO | WO 2004/038631 | | 5/2004 |
| WO | WO 2004/068422 | | 8/2004 |
| WO | WO 2005/013209 | A2 | 2/2005 |
| WO | WO 2005/017842 | A1 | 2/2005 |
| WO | WO 2005/028348 | A2 | 3/2005 |
| WO | WO 2005/029240 | A2 | 3/2005 |
| WO | WO 2005/036445 | A1 | 4/2005 |
| WO | WO 2005/076229 | A1 | 8/2005 |
| WO | WO 2006/039439 | A2 | 4/2006 |
| WO | WO 2006/076289 | A2 | 7/2006 |
| WO | WO 2006/076634 | A2 | 7/2006 |

OTHER PUBLICATIONS

Diebold: 3030 Bulk Cash Recycling ATM Specification sheets, 4 pages (dated: unknown; downloaded Feb. 4, 2009).

Diebold: 228 Express Cash Recycler Planning and Site Preparation Guide, 14 pages (Jul. 2008).

* cited by examiner

CURRENCY DISPENSER

CROSS REFERENCE TO RELATED APPLICATIONS

This application claims the benefit of U.S. Provisional Application No. 60/445,656, filed Feb. 7, 2003.

FIELD OF THE INVENTION

The field of the invention relates generally to a document processing system and, more specifically, to systems whereby documents are withdrawn and/or deposited into the document processing system.

BACKGROUND OF THE INVENTION

Currently, in financial institutions, when tellers accept deposits from customers, currency bills may be manually counted and then put into a cash drawer. Checks are often clipped with a receipt indicating the depositor and then put to the side until the teller has time to verify the amounts. In some instances, the currency bills and the checks may both be set aside for processing at a later time. Generally, however, the customer is given a receipt at the time the transaction occurs, indicating the amount of the transaction. The receipt is generally based on the numbers given to the teller by the customer.

Since the currency bills are put into the cash drawer along with other currency bills, there is no way to track the currency bills that are deposited into the system. After bills have been placed into the cash drawer, there is no way to tie or link the currency bills which have been deposited to the customer who deposited them. If a currency bill is subsequently identified as being counterfeit (for example, when the bill is forwarded to the Federal Reserve and the Federal Reserve identifies the bill as being counterfeit), the bank must bear the loss since the currency bill was not linked or otherwise associated with the person depositing the bill.

As mentioned above, the amounts of the checks are often not verified until after the customer is given a receipt for the transaction. If there is a discrepancy, such as an adding error on the part of the customer, the customer will not be notified until after receiving a receipt indicating otherwise. Since the customer has a receipt indicating the amount of the deposit, the customer may rely on this information. For example, the customer may withdraw or write checks based on the amount recorded on the receipt. Although a hold may also have been placed on the deposited funds, unless there are cleared funds to cover the attempted withdrawal, such attempts to withdraw may cause the customer to overdraw, which may cause customer dissatisfaction.

Also, when a customer requests money from the teller, the teller must manually count out and distribute the funds. This may be a time consuming process, which may also cause customer dissatisfaction. Furthermore, the teller may make an error in counting out the currency bills. If the teller withdraws too little, the customer is likely to be dissatisfied. If the teller withdraws too much, the customer may not inform the institution, which would cause the institution to lose money.

Another problem with the current situation is that deposited checks often must be transported to another location for scanning and processing. This creates an extra step, adding time to a time sensitive process (since the checks must be presented to the issuing bank within a certain amount of time).

SUMMARY OF THE INVENTION

One embodiment is a currency processing system for receiving a stack of currency bills from a user, for dispensing bills to a user, and for denominating both bills received and bills dispensed. In one embodiment, the system comprises an input receptacle for receiving the stack of bills; and a single output receptacle for receiving processed bills, wherein the single output receptacle is spaced apart from the input receptacle and easily accessible to the user. A transport mechanism is adapted to transport bills individually from the input receptacle to the single output receptacle. A dispensing receptacle contains bills for dispensing; and a dispensing mechanism is adapted to dispense bills individually from the dispensing receptacle to the transport mechanism for individual transport to the single output receptacle. A sensor is positioned relative to the transport mechanism to acquire evaluation data from each bill, in seriatim, as the bills are transported to the single output receptacle. A processor is coupled to the sensor and adapted to determine denomination of a bill based on the evaluation data associated with the bill, whereby each bill transported to the single output receptacle may be denominated.

In some embodiments, more than one output receptacle is provided.

In some embodiments, the currency processing system includes an image scanner adapted to obtain an image of the bills deposited and/or dispensed.

Some embodiments are similar to those described above but are additionally adapted to process documents in addition to currency bills such as checks and hence constitute document processing systems.

The above summary of the present invention is not intended to represent each embodiment, or every aspect, of the present invention. This is the purpose of the figures and the detailed description which follow.

Figure 1:
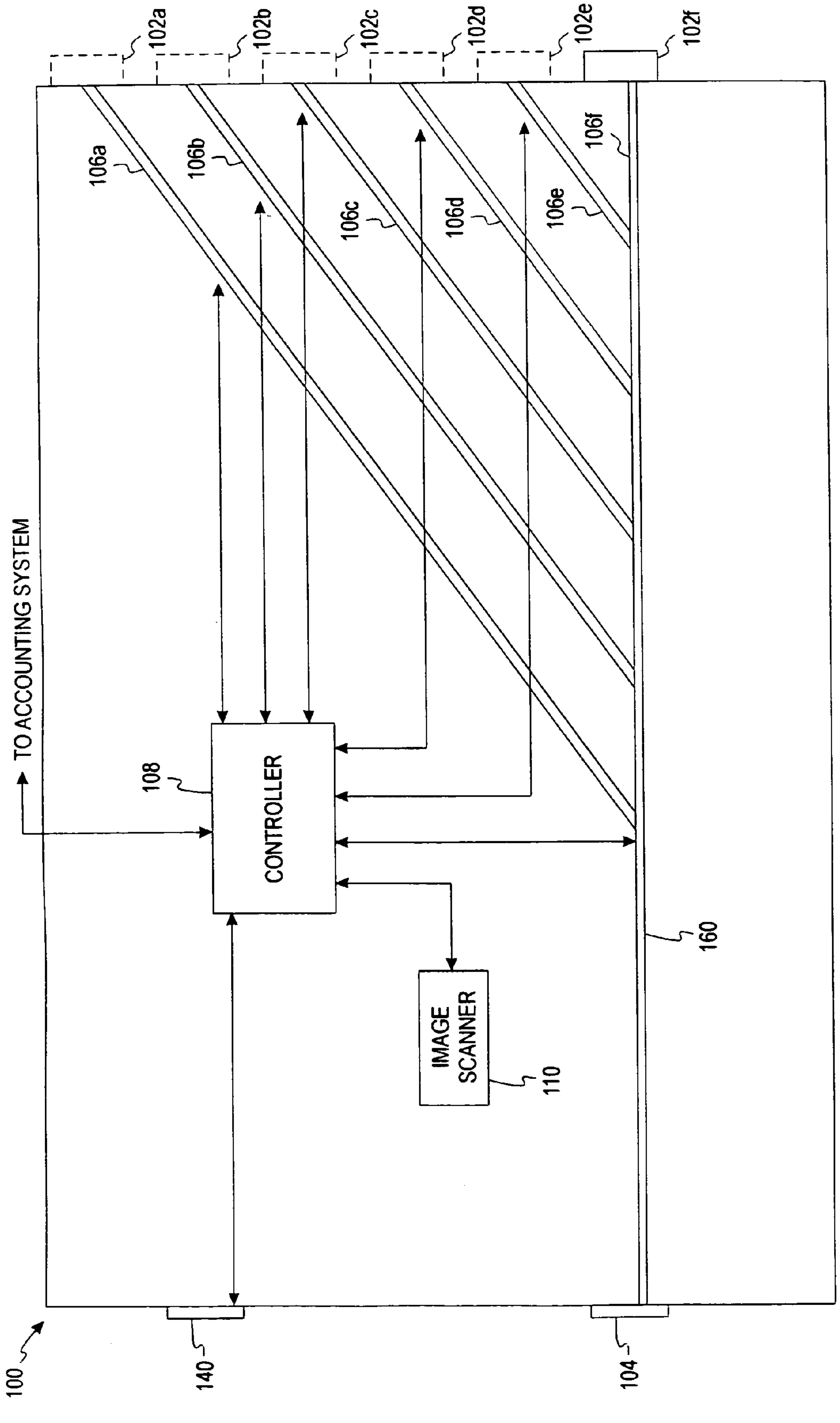
FIG. 1 is a block diagram of a dispensing device according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Currently, employees such as tellers and cashiers, utilize a manual system for accepting and dispensing currency bills and financial institution documents to and from customers. The term "employee" refers to anyone authorized by the institution to update a customer's account at the institution or authorized to transact at least some types of business on behalf of the institution; store or casino. This may include tellers, customer service representatives, trust bankers, and others employed by a financial institution. It also may include cashiers employed by a store or a casino. This term also includes people who may not be employees of the institution, but are authorized to access the accounts, such as contract workers, consultants, and/or jobbers.

The term "currency bills" refers to all paper or currency paper-like currency (e.g., sheet currency made of or comprising plastic), including both U.S. and foreign currency bills.

The term "financial institution documents" refers to checks, deposit slips, withdrawal slips, loan payment documents, loan request documents, etc. The employees may also accept and/or disburse coupons or bar coded documents, such as coupons redeemable at a grocery store or bar coded winnings tickets that indicate the amount of prize money won by an individual.

The term "customer" refers to a person having an account at the institution or using the services of the institution. For example, a customer at a bank is a person having an account at the bank. A customer at a grocery store is someone purchasing goods at the store. A customer at a casino is someone who is gambling or purchasing goods at the casino.

The terms "operator" and "user" are general terms referring to anyone, customers, employees, or others, who are operating or otherwise using the system. The discussion below focuses on use of a system at a financial institution such as a bank and a customer depositing and withdrawing funds via the system. The concepts discussed herein are also applicable to retail stores, casinos, and other businesses.

Currently, employees must manually count out the currency bills and financial institution documents they receive and disburse; this is time consuming and increases the risk of miscounting and counterfeits being passed and other errors occurring. To reduce these risks and others, a document processing device of the present invention may be used.

Turning now to FIG. 1, a currency dispensing system 100 according to one embodiment of the present invention is described. The currency dispensing system 100 includes a plurality of dispensers 102*a-f* and an output receptacle 104. Each of the dispensers 102*a-f* is adapted to hold a different denomination of currency, or like denomination of currency. For example, dispenser 102*a* may hold $1, dispenser 102*b* may hold $5, dispenser 102*c* may hold $10, dispenser 102*d* may bold $20, dispenser 102*e* may hold $50, and dispenser 102*f* may hold $100. Alternatively, two or more dispensers may hold the same denomination. For example, in the above example, dispenser 102*c* my hold $20 rather than $10 so that both dispensers 102*c* and 102*d* would hold $20 bills. Such arrangements may be useful when it expected that more of one or more denominations, such as $20s, will be dispensed relative to some of the other denominations.

Figure 2A:
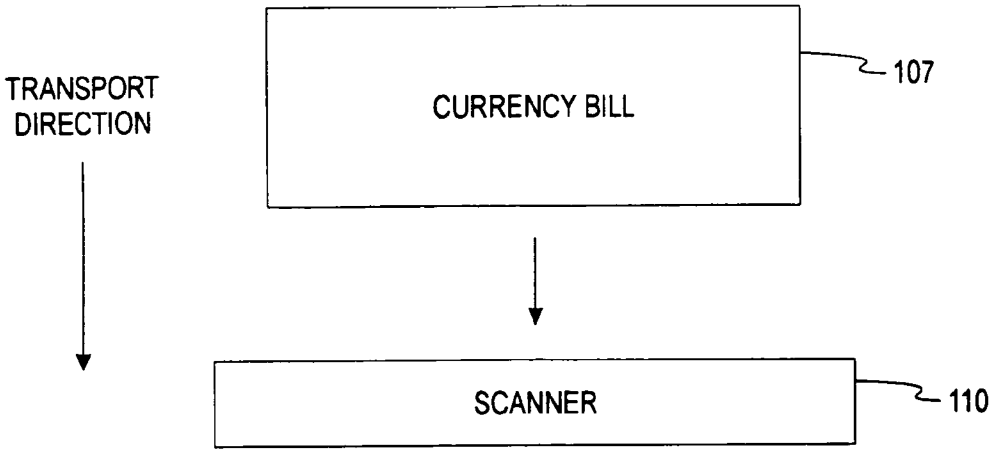
FIGS. 2*a* and 2*b* illustrate potential bill orientations for transporting a bill through a scanner.
Figure 2B:
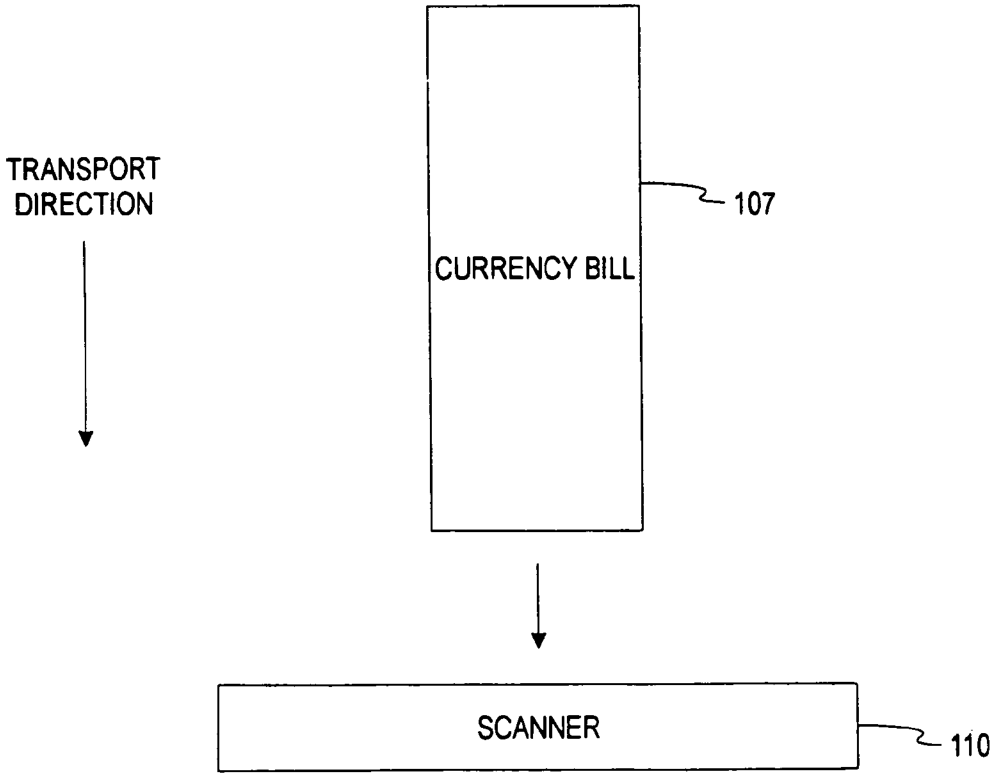

Each of the plurality of dispensers 102*a-f* is connected to the output receptacle 104 via a transport mechanism 106*a-f*. As shown in FIG. 2*a*, the transport mechanisms 106*a-f* may be adapted to transport currency bills such that the longer edge of a currency bill 107 is perpendicular to the direction of transport. Stated differently, a long edge of the currency bill 107 is the leading edge. In other embodiments, the transport mechanisms 106*a-f* may be adapted to transport currency bills such that a longer edge of the currency bill 107 is parallel to the direction of transport, as shown in FIG. 2*b*. Stated another way, a short edge of the currency bill is the leading edge. In some embodiments, one or more bills may be transported in a skewed manner. Examples of transport mechanisms are discussed in more detail in U.S. Pat. Nos. 5,815,592 and 6,311,819, both of which are incorporated herein by reference in their entirety. The transport orientation described in this paragraph also applies to the other embodiments discussed below such as those discussed in connection with FIGS. 3-11.

Returning to FIG. 1, a controller 108 controls the operation of the transport mechanisms 106*a-f* as is further described below. The controller 108 is also coupled to an image scanner 110 that is located along the path of transport mechanisms 106*a* -f, such that any bill dispensed from any of the dispensers 102*a-f* is transported past the image scanner 10 on its way to the output receptacle 104. The image scanner 110 is adapted to obtain images of the currency bills as the currency bills are transported past the image scanner 110 and to the output receptacle 104.

Figure 6:
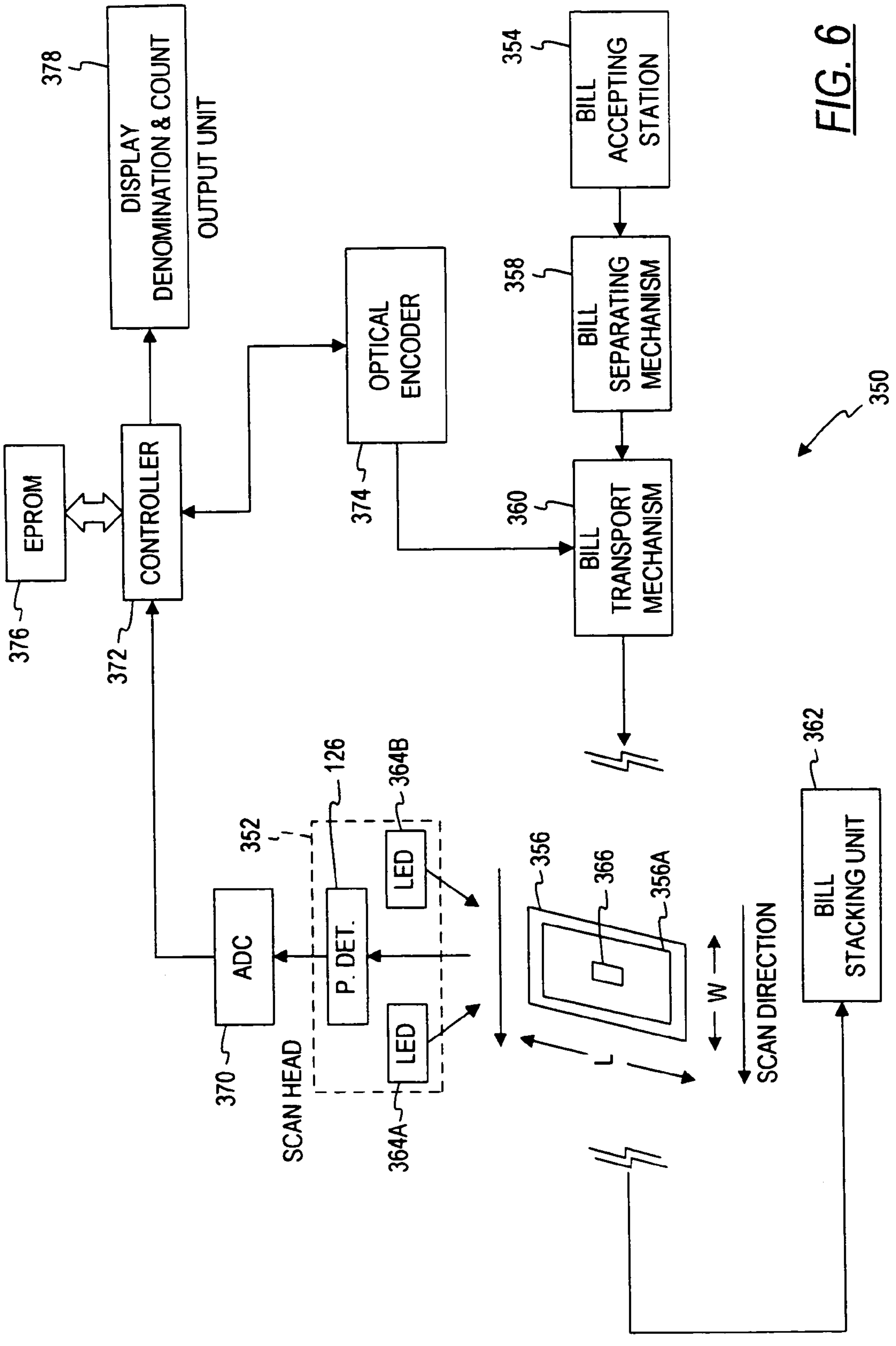
FIG. 6 is a block diagram of example bill discriminating components which may be used in conjunction with some of the dispensing and/or deposit devices discussed in this application.

In an alternate embodiment, the image scanner may be replaced by one or more sensors adapted to retrieve information from passing bills which permits the passing bills to be denominated such as sensor 126 depicted in FIG. 6. Examples of denomination sensors or units are discussed in more detail below such as in connection with FIGS. 4 and 6 as well as in U.S. Pat. Nos. 5,295,196 and 5,687,963, both of which are incorporated herein by reference in their entirety. Similarly, in other alternate embodiments, one or more denomination sensors may be added to the system depicted in FIG. 1 in addition to the image scanner 110.

Further operation of the system 100 according to one embodiment of the present invention will now be described. An operator inputs a withdrawal request into the controller 108 such as via an operator interface 140. The controller 108 will receive the request and instruct one or more of the transport mechanisms 106*a-f* to begin transporting an appropriate number of currency bills from the appropriate dispensers 102*a-f*. The controller may require a transaction identification, or some other verification or tracking information, from the operator before dispensing any currency. In a retail environment, the dispensers may be coupled to a cash register that calculates the amount of currency to be dispensed.

The transport mechanisms 106*a-f* that are activated cause the appropriate dispensers 102*a-f* to dispense the appropriate number of currency bills. The currency bills are then transported, one at a time, past the image scanner 110 and to the output receptacle 104. The dispensers can be activated one at a time so bills do not collide, overlap, etc.

When a currency bill is transported past the image scanner 110, the controller 108 instructs the image scanner 110 to obtain an image of the currency bill. The scanner 110 then transmits the image back to the controller 108 for processing. In some embodiments, the controller 108 is adapted to use the image of the currency bill to denominate the bill. After being scanned, the currency bill is then transported by the transport mechanism 106*a-f* to the output receptacle 104, where the bills are accumulated and then removed by the operator.

To more clearly explain the operation, a specific example will be discussed. An operator inputs a withdrawal request of $175 into the controller 108 via an operator interface 140. The controller 108 activates the transport mechanisms 106*a-f* that are associated with the $100 bills, $50 bills, $20 bills and $5 bills. In this example, the controller would activate transport mechanisms 106*b*, 106*d*, 106*e*, and 106*f*. The activation of the transport mechanisms 106*b,d,e,f* would cause the associated dispensers 102*b*, 102*d*, 102*e*, and 102*f* to each dispense a currency bill. The transport mechanism only causes the dispenser to dispense the needed number of bills (in this example, one from each of the four dispensers 102*b*, 102*d*, 102*e*, 102*f*).

After a bill is transported out of the dispenser, the transport mechanisms 106 b, d, e, f will carry each bill, one by one, past the image scanner 111 to the output receptacle 104 for disbursement to the operator. The image scanner 110 is activated by the controller 108, and obtains images of the bills as they are transported past. The images obtained by the image scanner 110 are then sent to the controller 108 for further processing. In some embodiments, the controller 108 may discriminate the bill based upon the image by comparing at least a portion of the image to master reference data stored in memory and, thus can verify that the correct amount was dispensed to the operator.

The above-described embodiment is able to disburse bills with greater speed an accuracy than when done manually. Although the operator may manually count out the dispensed bills to the customer for further verification, the bills are dispensed quicker by the system 100 than if the operator had to pull the bills out of a cash drawer. Furthermore, the record of the disbursement is created electronically, within the controller, so the operator does not have to manually prepare a record, which also reduces the likelihood of error.

Some embodiment may include one or more additional output receptacles. For example, when it is determined that an incorrect denomination of bills has been dispensed from one of the dispensing receptacles 102*a-f* (e.g., a $20 bill was incorrectly included in and dispensed from the $10 dispensing receptacle), such incorrect bill may be routed to a different output receptacle (which may be an internal retaining receptacle) and another bill may be dispensed in its place. Bills which are determined to be suspect (discussed in more detail below) may be handled in a similar manner.

Figure 3:
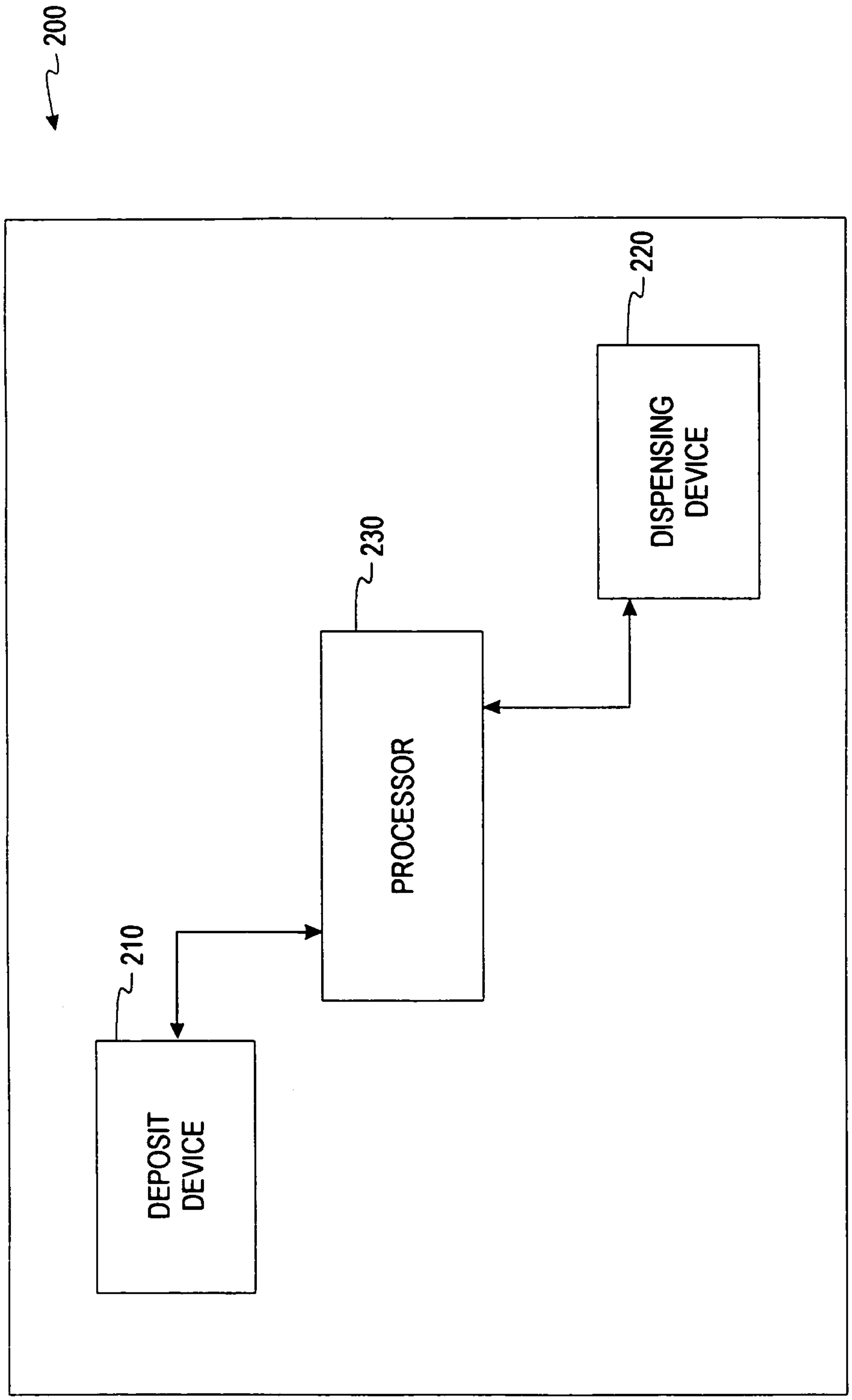
FIG. 3 is a block diagram of a document processing device adapted to receive a deposit and to dispense a withdrawal.

Turning now to FIG. 3, a document processing system 200 according to another embodiment is illustrated. In this embodiment, the document processing system 200 includes a deposit device 210, a dispensing device 220, and a processor 230. The dispensing device 220 may be the same as the dispensing device 100 described above and processor 230 may be the same as or in addition to controller 108. The deposit device 210 receives documents such as financial institution documents and currency bills for deposit into a customer's account (or for payment of goods and/or services). The dispensing device 220 dispenses currency bills to the customer. The processor 230 controls the operation of the dispensing device 220 and/or the deposit device 210. The processor 230 accepts-instructions from an employee and/or customer and transmits the instructions to the appropriate machine. Alternatively, the processor 230 may be included in the dispensing device 220 (as described in the above embodiment), the deposit device 210, or both.

The operation of the embodiment illustrated in FIG. 3 will now be described by way of an example. An operator inputs a withdrawal request and a deposit request into the processor 230 via an operator interface (not shown). The processor 230 activates the dispensing device 220 to dispense an amount corresponding to the withdrawal request. The processor 230 activates the deposit device 210 to accept documents that make up the deposit request.

The details of one embodiment of the deposit device 210 is described below in connection with FIG. 4. According to some embodiments, the document processing system according to the present embodiment allows an operator to both deposit and withdraw funds using a single machine. In alternate embodiments, the deposit 210 and dispensing devices 220 may be housed separately but connected to form a single system. This dual functionality reduces the costs to the financial institutions as they only have to purchase one machine. Costs resulting from human error are reduced because the document processing system 200 is quicker and more accurate. The operator does not have to manually withdraw funds from a drawer and then count the funds or manually separate deposited documents into categories and then count and total the value of the documents.

Figure 4:
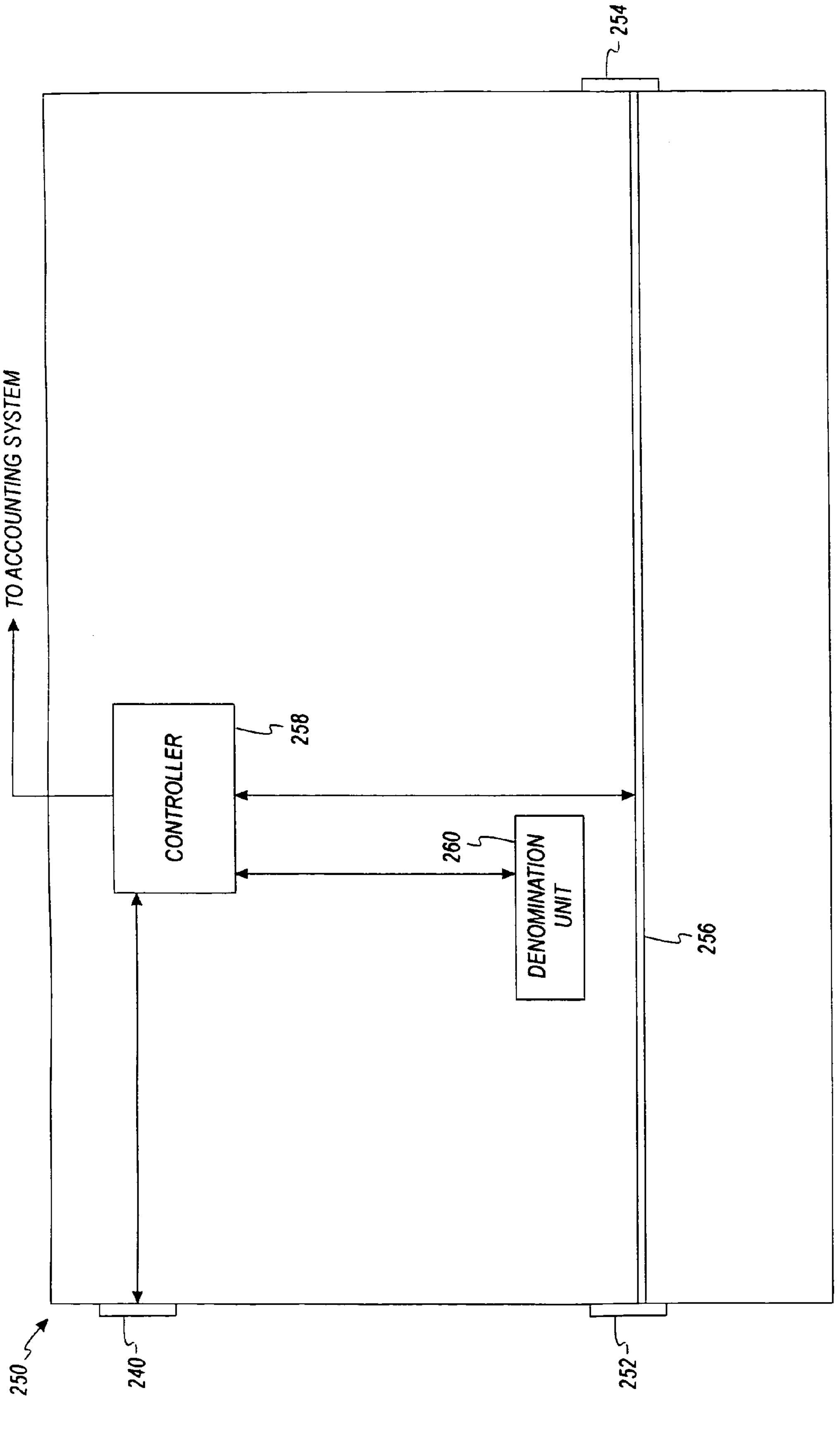
FIG. 4 is a block diagram of a deposit device in accordance with an embodiment of the invention.

FIG. 4 is a block diagram illustrating a deposit device 250. The deposit device 250 includes an input receptacle 252 and a storage receptacle 254. The input receptacle 252 is adapted to receive currency bills for deposit into the device. A stack of currency bills placed in the input receptacle 252 may be sorted by denomination, or the stack of currency bills may be of mixed denominations. A transport mechanism 256 transports bills from the input receptacle 252 to the storage receptacle 254, one at a time, along a transport path. The transport mechanism 256 may be adapted to transport the currency bills in the wide or the narrow direction, as described above in FIGS. 2*a* and 2*b*. The storage receptacle 254 may comprise one or more output receptacles.

A processor or controller 258 controls the operation of the movement of the transport mechanism. When a currency bill or stack of currency bills is placed into the input receptacle and a deposit request is input into the controller 258, the controller 258 activates the transport mechanism 256 to transport the currency bills, one at a time, from the input receptacle 252 and into the storage receptacle 312.

In the present embodiment, the controller 258 also controls operation of a denominating unit 260. The denominating unit 260 is located along the transport path and is adapted to determine the denominations of the currency bills as they are transported past the denominating unit 260 by the transport mechanism.

The deposit device 250 thus may verify the amount of the deposit request and to count the number of different denominations that are being transported to the storage device 254.

The denominating unit 260 may determine the denominations of passing bills itself and pass this information on to the controller 258 or the denominating unit 260 may comprise one or more denomination sensors which retrieve characteristic information from passing bills and transmit such characteristic information along to the processor or controller 258 which in turn determines the denominations of passing bills.

The denominating unit 260 may comprise one or more sensors, depending on a number of variables. The variables relate to which distinguishing characteristics of the currency bills are being examined, for example, size, thickness, color, magnetism, reflectivity, absorbability, transmissivity, electrical conductivity, serial number, and so forth. The denominating unit 260 may also employ a variety of detection components including, but not limited to, any combination of the following: a size detector, a density sensor, an upper optical scan head, a lower optical scan head, a single or plurality of magnetic sensors, a thread sensor, an infrared sensor, an ultraviolet/fluorescent light scan head, or an image scanner. These detection components and a host of others are disclosed in commonly assigned U.S. Pat. No. 6,278,795, entitled "Multi-Pocket Currency Discriminator," which is incorporated herein by reference in its entirety, and co-pending U.S. patent application Ser. No. 09/965,428, entitled "A Document Processing System Using Full Image Scanning," filed on Sep. 27, 2001, which is incorporated herein by reference in its entirety. Examples of discriminating denomination information from a currency bill are shown and disclosed in commonly assigned U.S. Pat. No. 5,815,592, which is incorporated herein by reference in its entirety. Likewise, examples of denomination sensors or units are discussed in more detail in U.S. Pat. Nos. 5,295,196 and 5,687,963, both of which are incorporated herein by reference in their entirety.

An example of the operation of the deposit device 250, in which the denominating unit 260 is a more general discrimination unit 260 will now be described. An operator inputs a deposit request such as via an operator interface 240 into the controller 256 of the deposit device 250. The operator then inserts a stack of currency bills into the input receptacle 252 for deposit. Once the currency bills are placed in the input receptacle 252, the controller 258 activates the transport mechanism to begin transporting the currency bills, one at a time, from the input receptacle 252, past the discrimination unit 260 and to the storage receptacle 254. As the currency bill reaches the discrimination unit 260, the controller 258 activates the sensors within the discrimination unit 260 so as to discriminate the currency bill. The currency bill is then transported to the storage receptacle 254 for storage.

After discriminating the currency bills, the discrimination unit 260 communicates the denominations of the currency bills to the controller 258. The controller 258 may use the denomination information to compare the amount denominated by the discrimination unit 260 with the amount input during the deposit request. This is one method that allows the teller to give the customer an accurate deposit receipt—decreasing the possibility of customer dissatisfaction. The controller 258 may also use this denomination information to update a financial account belonging to the person depositing the currency bills to reflect what the amount of the deposit was.

In some embodiments the denomination unit 260 is replaced with an image scanner as in FIG. 1. Alternatively, in some embodiment, an image scanner may be added to the system 250 in addition to the denomination unit 260.

Image Scanner

Figure 5:
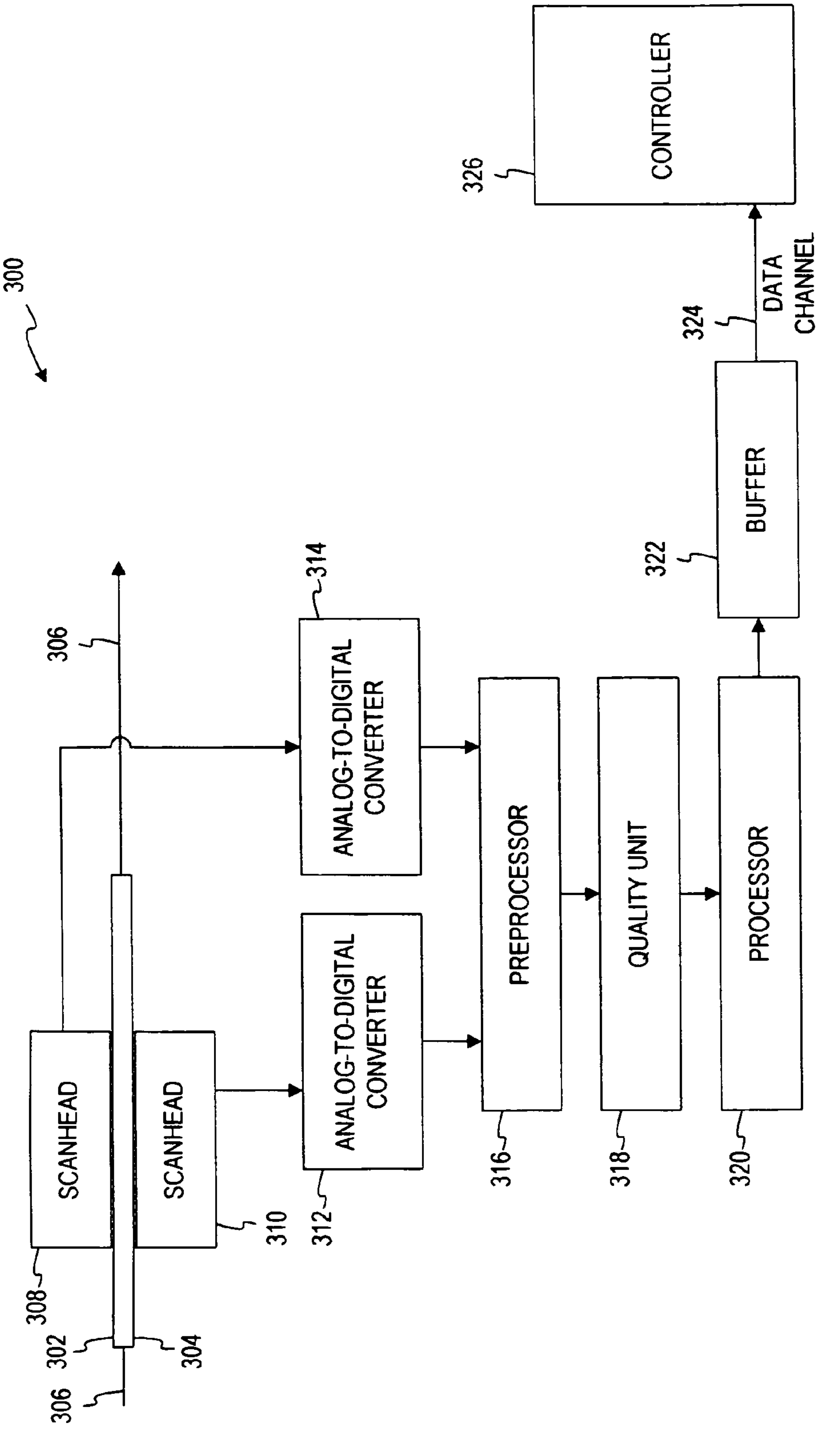
FIG. 5 is a block diagram of an example image scanner which may be used in conjunction with some of the dispensing and/or deposit devices discussed in this application.

Turning now to FIG. 5, an image scanner 300 will be described according to one embodiment of the present invention. The image scanner 300 may be of the type disclosed in U.S. Pat. No. 4,888,812, which is incorporated herein by reference in its entirety. As shown in FIG. 5, the front 302 and back 304 surfaces of documents 306 are scanned by a pair of scanheads 308 and 310, that convert the images into electronic data representing those images.

The scanheads 308 and 310 include electronic circuitry that generates a sequence of analog signals representing light and dark images defining the image on the document. The scanheads 308 and 310 may be arranged for simultaneously scanning both the front 302 and back 304 surfaces of the documents 306 and are connected respectively to analog-to-digital converters 312 and 314 that convert the analog values into discrete binary gray scale values of, for example, 256 gray scale levels. The scanheads 308 and 310 are capable of obtaining images of varying resolutions. The particular resolution chosen, which can be varied by the user, is selected based upon the type of document being scanned, as is known in the art. A commercially available imaging scanhead for use with one embodiment of the present invention is the PI228MC-A4 Contact Image Sensor (CIS) Module made by Peripheral Imaging Corporation in San Jose, Calif., which contains a light source, focusing optics, detector array and electronics for producing an analog output containing 1728 pixels/line with a density of 200 pixels/inch.

The high resolution gray scale image data from the analog-to-digital converters 312 and 314 is received by an image data preprocessor 316 in which the data may be enhanced and smoothed and which serves to locate the edges of successive documents and discard irrelevant data between documents. If the documents are slightly skewed, the image preprocessor 316 can also perform rotation of the image data to facilitate subsequent processing.

The image data output of the preprocessor 316 is monitored for the occurrence of unacceptable image quality by an image quality unit 318. For example, the image quality unit 318 monitors the distribution of gray scale values in the image data and creates a histogram. Acceptable quality images have a distribution of gray scale values within certain prescribed limits. If the gray scale distribution of the histogram falls outside these limits, this is indicative of poor image quality and an error condition is generated by the quality unit 318.

The image data is transmitted from the quality unit 318 to a processor 320 that outputs the processed image data to a buffer 322 at the data input channel 324 to a controller 326. OCR and/or ICR can use the image data to extract or capture specified information from specified fields of the image. For example, when processing checks, OCR can detect the "$" symbol as a coordinate to the left of the numeric check amount field box, and then extract the amount from that box. A straight coordinate system or dimension system is used where known dimensions of the box are used to locate the field. Also, when scanning currency, OCR can detect the field where the serial numbers are printed and extract those numbers.

When scanning bar-coded documents, the scanhead obtains an image of the document, or just the bar-coded portion of the document, and that image is used to decipher the information from the bar code. For example, in some embodiments if a bar code is used to represent the value of the document (e.g., on a casino redemption ticket or a "Disney Dollar"), the scanhead obtains an image of the bar code and then uses that image to read the bar code and determine the value of the document, rather than reading the bar code directly from the document. Computer software for decoding bar-coded information from an image of the bar code are commercially available, e.g., from VisionShape, Inc. of Placentia, Calif., or Kofax Image Products of Irvine, Calif. In other embodiments, a bar code reader may read the bar code directly from a document.

According to one embodiment, the controller 326 is programmed to locate fields for various types of currency and perform processing. Based on scanning certain areas on the currency or document, the controller 326 first identifies the type of currency—for example, identifying the bills as being U.S. bills. Then, based on that identification, certain fields of interest are located, and the information in those fields is extracted and stored for use by the system—for example, the serial number, series designation, and/or denominational designations of U.S. bills.

The controller 326 may also compress the image data, by methods known in the art, for storage or in preparation for transmission to another location, such as an outside location. Programs for extracting and storing information from prescribed fields in a document image are commercially available. For example, OCR and ICR engines for converting pre-defined characters or data fields into editable text and mapping it directly into a database are available from Mitek Systems, Inc. in San Diego, Calif. Check readers and OCR line readers are commercially available from a variety of sources. Programs for converting bitmap images of handwritten numeric amounts (e.g., written on checks or other documents) into computer-usable character data are available from Orbograph Corporation in Billerica, Mass.

The amount of image data per document may vary depending upon the size and nature of the document and the efficiency of any compression of the image data obtained by scanning that particular document. To ensure that no data is lost in the event that the volume of image data temporarily exceeds the transfer capacity of the high speed data channel, a pre-channel buffer 322 is interposed prior to the data channel 324, which is connected to the controller 326. The capacity of the pre-channel buffer 322 is continually monitored by the controller 326 so that appropriate action may be taken if the buffer becomes overloaded. The compressed image data is received by the controller 326 over the high-speed data channel 324 and may be initially routed to temporary storage. The image buffer is preferably of a size capable of storing the image data from at least several batches or runs of checks or similar documents. The controller 326 performs the functions of analyzing the data. Alternatively, analysis of the data can occur at central office computer or at a personal computer attached to the system.

Other scanning modules and methods can be used in place of, or in addition to, the particular one described above. These include CCD array systems, multi-cell arrays and other well-known scanning techniques. Examples of these techniques and devices are described in U.S. Pat. Nos. 6,661,910; 6,363,164; 5,023,782; 5,237,158; 5,187,750; and 4,205,780, each of which is incorporated herein by reference in its entirety. The scanning module can also be a color image scanner such as the type described in U.S. Pat. No. 5,335,292, which is incorporated herein by reference in its entirety.

Discrimination and/or Authentication

An embodiment of the present invention having discrimination and/or authentication functionality will be described in connection with FIG. 6. This illustrated embodiment as well as others are described in detail in U.S. Pat. No. 6,381,354 and published PCT application WO 95/24691, each of which is incorporated herein by reference in its entirety. FIG. 6 is a functional block diagram of a currency denominating device 350 having a single scanhead 352. The unit 350 includes a bill-accepting station 354 where a bill 356 in a stack, more generally stacks of bills 356 that need to be identified and counted are picked up, one bill at a time, by a bill separating mechanism 358 for sequential relay by a transport mechanism 360 along a transport path, across a scanhead 352 where the currency denomination of the bill is identified. The scanhead 352 is an optical scanhead that scans for characteristic information from a scanned bill 356 that is used to identify the denomination of the bill. The scanned bill 356 is then transported to a bill stacking station 362.

The optical scanhead 352 of FIG. 6 comprises a pair of light sources 364A and 364B directing light onto the bill transport path so as to illuminate a substantially rectangular strip 366 on a bill 356 positioned adjacent the scanhead 352. Light reflected off the illuminated strip 366 is sensed by a photodetector 368 positioned directly adjacent the strip. The analog output of the photodetector 368 is converted into a digital signal by means of an analog-to-digital (ADC) converter 370 whose output is fed as a digital input to the controller 372.

While the scanhead 352 of FIG. 6 is an optical scanhead, it may be designed to detect a variety of different types of characteristic information from bills. Additionally, the scanhead may employ a variety of additional detection means such as magnetic, electrical conductivity, and capacitive sensors, as discussed in more detail below.

Referring again to FIG. 6, the bill transport path in this embodiment is defined in such a way that the transport mechanism 360 moves bills with the narrow dimension of the bills parallel to the transport path and the scan direction. As a bill 356 traverses the scanhead 352, the light strip 366 traverses the bill across the narrow dimension of the bill. As depicted, the transport path is so arranged that a bill 356 is scanned by the scanhead 352 approximately along the central section of the bill along its narrow dimension, as shown in FIG. 6. The scanhead 352 functions to detect light reflected from the bill as it moves across the illuminated light strip 366 and to provide an analog representation of the variation in light so reflected which, in turn, represents the variation in the dark and light content of the printed pattern or indicia on the surface of the bill. This variation in light reflected from the narrow dimension scanning of the bills serves as a measure for distinguishing, with a high degree of confidence, among multiple currency denominations that the discrimination unit is programmed to handle.

A series of such detected reflectance signals are obtained across the narrow dimension of the bill, or across a selected segment thereof, and the resulting analog signals are digitized under control of the controller 372 to yield a fixed number of digital reflectance data samples. The data samples are then subjected to a normalizing routine that processes the sampled data for improved correlation and for smoothing out variations due to contrast fluctuations in the printed pattern on the bill surface. The normalized reflectance data represents a characteristic pattern that is unique for a given bill denomination and provides sufficient distinguishing features among characteristic patterns for different currency denominations. This process is more fully explained in U.S. Pat. No. 5,295,196 for a "Method and Apparatus for Currency Discrimination and Counting," which is incorporated herein by reference in its entirety.

In order to ensure strict correspondence between reflectance samples obtained by narrow-dimension scanning of successive bills, the initiation of the reflectance sampling process is preferably controlled through the controller 372 by means of an optical encoder 374 which is linked to the bill transport mechanism 360 and precisely tracks the physical movement of the bill 356 across the scanhead 352. More specifically, the optical encoder 374 is linked to the rotary motion of the drive motor which generates the movement imparted to the bill as it is relayed along the transport path. In addition, the mechanics of the feed and transport mechanism (see U.S. Pat. No. 5,295,196 referred to above) ensure that positive contact is maintained between the bill and the transport path, particularly when the bill is being scanned by the scanhead 352. Under these conditions, the optical encoder 374 is capable of precisely tracking the movement of the bill 356 relative to the light strip 366 generated by the scanhead 352, by monitoring the rotary motion of the drive motor.

The output of the photodetector 368 is monitored by the controller 372 to initially detect the presence of the bill underneath the scanhead 352 and, subsequently, to detect the starting point of the printed pattern on the bill, as represented by the thin borderline 356A which typically encloses the printed indicia on bills. Once the borderline 356A has been detected, the optical encoder 374 is used to control the timing and number of reflectance samples that are obtained from the output of the photodetector 368 as the bill 356 moves across the scanhead 352 and is scanned along its narrow dimension.

The use of the encoder 374 for controlling the sampling process relative to the physical movement of a bill 356 across the scanhead 352 is also advantageous in that the encoder 374 can be used to provide a predetermined delay following detection of the borderline prior to initiation of sampling. The encoder delay can be adjusted in such a way that the bill 356 is scanned only across those segments along its narrow dimension which contain the most distinguishable printed indicia relative to the different currency denominations.

In the case of U.S. currency, for instance, it has been determined that the central, approximately two-inch (5 cm) portion of bills, as scanned across the central section of the narrow dimension of the bill, provides sufficient data for distinguishing among the various U.S. currency denominations on the basis of the correlation technique disclosed in U.S. Pat. No. 5,295,196 referred to above. Accordingly, the encoder 374 can be used to control the scanning process so that reflectance samples are taken for a set period of time and only after a certain period of time has elapsed after detection of the borderline 356A, thereby restricting the scanning to the desired central portion of the narrow dimension of the bill.

The controller 372 is programmed to count the number of bills belonging to each currency denomination as part of a given batch of bills that have been scanned, and to determine the aggregate total of the currency amount represented by the scanned bills in that batch. The controller 372 is also linked to an EPROM 376 and an output unit 378 which provides a display of the number of bills counted, the breakdown of the bills in terms of denomination, and the aggregate total of the currency value represented by the counted bills. The output unit 378 can also be adapted to provide a print-out of the displayed information in a desired format.

The scanhead 352 may comprise multiple scanheads positioned next to each other, or a single stationary scanhead extending across the entire width of the documents being scanned. In this case, the same scanhead may be used to generate the data needed to denominate bills and to display and store the images that appear on bills and other types of documents. For example, the electronic data from a single scanhead may be used to denominate bills, and to store images of bills, checks and other documents. Alternatively, the same data may be used to also store images of only the serial numbers of bills. One example of such a full-width imaging scanhead is the aforementioned PI228MC-A4 Contact Image Sensor (CIS) Module made by Peripheral Imaging Corporation in San Jose, Calif.

Two-sided scanning may be used to permit bills to be fed into a currency discrimination unit with either side face up, and also to permit high-speed scanning of images on both sides of the documents being scanned. Examples of two-sided scanhead arrangements are disclosed in U.S. Pat. Nos. 5,467,406 and in 6,381,354, each of which is incorporated herein by reference in its entirety. Master data such as master patterns generated by scanning genuine bills may be stored for segments on one or both sides of bills of all denominations. In the case where master data or patterns are stored from the scanning of only one side of a genuine bill, the data or patterns retrieved by scanning both sides of a bill under test may be compared to a master set of single-sided master data or patterns. In such a case, data or a pattern retrieved from one side of a bill under test should match one of the stored master data or patterns, while data or a pattern retrieved from the other side of the bill under test should not match any of the master data or patterns. Alternatively, master data or patterns may be stored for both sides of genuine bills. In such a two-sided system, data or a pattern retrieved by scanning one side of a bill under test should match one of the master data or patterns for one side (Match 1) of a genuine bill, and data or a pattern retrieved from scanning the opposite side of the bill under test should match one of the master data or patterns of the opposite side of a genuine bill (Match 2).

A counterfeit detection function may also be included in the device 350. A variety of different counterfeit detection techniques are well known and have been incorporated in currency discriminators. These known counterfeit detectors detect a variety of different types of characteristic information from currency bills, and employ a variety of different detection components such as magnetic, optical of capacitive sensors. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

With regard to optical sensing, a variety of currency characteristics can be measured such as density (U.S. Pat. No. 4,381,447), color (U.S. Pat. Nos. 4,490,846; 3,496,370; 3,480,785), length and thickness (U.S. Pat. No. 4,255,651), the presence of a security thread. (U.S. Pat. No. 5,151,607) and holes (U.S. Pat. No. 4,381,447), and other patterns of reflectance and transmission (U.S. Pat. Nos. 3,496,370; 3,679,314; 3,870,629; 4,179,685). Color detection techniques may employ color filters, colored lamps, and/or dichroic beamsplitters (U.S. Pat. Nos. 4,841,358; 4,658,289; 4,716,456; 4,825,246, 4,992,860 and EP 325,364). An optical sensing system using ultraviolet light is described in U.S. Pat. No. 5,640,463, incorporated herein by reference.

In addition to magnetic and optical sensing, other techniques of detecting characteristic information of currency include electrical conductivity sensing, capacitive sensing (U.S. Pat. No. 5,122,754 (watermark, security thread); U.S. Pat. No. 3,764,899 (thickness); U.S. Pat. No. 3,815,021 (dielectric properties); U.S. Pat. No. 5,151,607 (security thread), and mechanical sensing (U.S. Pat. No. 4,381,447 (limpness); U.S. Pat. No. 4,255,651 (thickness).

A UV authenticating technique can be employed along with one or more other authenticating and/or discrimination techniques in alternative embodiments of a denominating and/or imaging system. For example, an imaging system may include both a UV authenticating system and a magnetic authenticating system. It is known that genuine U.S. bills reflect a high level of UV light and do not fluoresce in response to UV illumination, except in certain special cases described below. An embodiment of the imaging system employing both UV and magnetic authentication would be able to detect a counterfeit U.S. bill that passes the UV authentication test (e.g., reflects sufficient level of UV light and does not fluoresce in response to UV illumination), but fails the magnetic authentication test. Put another way, an embodiment of an imaging system that implements a plurality of authentication tests is able to detect counterfeit bills that would otherwise go undetected where only one authenticating test is employed. Further details of a currency processing system employing UV, fluorescence and magnetic authentication tests are described in detail in U.S. Pat. No. 6,363,164, which is incorporated herein by reference in its entirety.

Security features added to U.S. currency beginning with the 1996 series $100 bills include the incorporation into the bills of security threads that fluoresce under ultraviolet light. For example, the security threads in the 1996 series $100 bills emit a red glow when illuminated by ultraviolet light. The color of light emitted by security threads under ultraviolet light will vary by denomination, e.g., with the $100 bills emitting red light and the $50 bills emitting, blue or purple light. Thus, the red light emitted from the security thread of a $100 bill, in response to UV illumination can be used to both authenticate and denominate that bill.

Additionally, the location of the thread within the bill can be used as a security feature. For example, the security threads in all $100 bills are located in the same position. Furthermore, the location of the security threads in other denominations will be the same by denomination and will vary among different denominations. For example, the location of security threads in $10, $20, $50 and $100 bills may each be distinct. In such a situation, the presence of a security thread in a specific location can be used to identify the denomination of the bills. Alternatively, the location may be the same in the $20s and the $100s but different from the location of the security threads in the $50s. According to alternative embodiments, the imaging processing system includes sensors to evaluate the features of security threads, including location, in currency bills. A currency processing system for evaluating the authenticity of currency bills based on the fluoresce of security threads under UV illumination and the location of the security threads within the bills is described in U.S. Pat. No. 6,363,164 B1, which has been incorporated herein by reference.

Alternatively or additionally, sensors may be employed to detect bills or security threads printed or coated with thermochromic materials (materials that change color with a change in temperature). Examples of threads incorporating thermochromic materials are described in U.S. Pat. No. 5,465,301, incorporated herein by reference.

The issuance of an error code such as a no-call code (where the system is unable to denominate a bill) or a suspect code (suspected counterfeit document) may be used to suspend processing of a stack of bills such that the bill triggering one of these codes is the last bill delivered to a receiving receptacle before the operation of the system is suspended. Accordingly, the triggering bill may be examined by the operator of the system so that appropriate action may be taken based on the operator's evaluation of the triggering bill. Alternatively, in a system having two or more receiving receptacles, the issuance of one of these error codes may cause the triggering bills to be diverted to a different receptacle such as a reject receptacle, or bills that result in a no-call code may be diverted to one receptacle and those that result in a suspect code may be diverted to a different receptacle. Accepted bills may be routed to one or more other receptacles. When the currency bill that triggers a suspect code has been imaged, the electronic data representing that image is preferably retained in association with an identification of the customer who deposited that bill, so that the account of that customer can be debited in the event the bill is confirmed to be a counterfeit.

Figure 7:
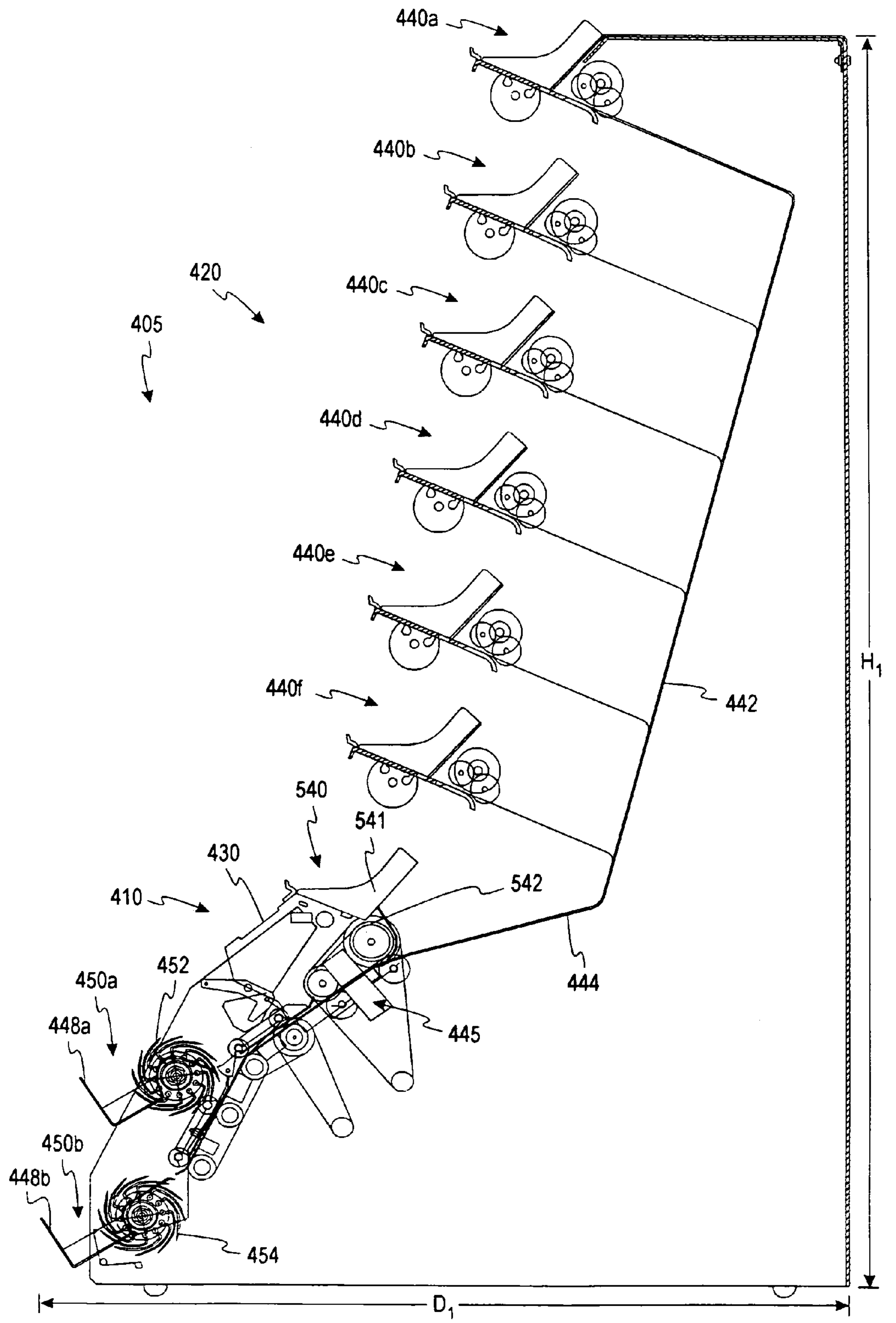
FIG. 7 is a side sectional view of a document processing system in accordance with principles of the invention and having dispensing capabilities.

Turning now to FIG. 7, a sectional view of a compact document processing system 405 according to principles of one embodiment is illustrated. The system 405 comprises an evaluation module 410 and a dispensing module 420. The dispensing module 420 is responsive to a user interface 430 coupled to both the evaluation module 410 and dispensing module 420. The document processing system 405 illustrated includes six dispensing receptacles 440*a-f*. The dispensing receptacles 440*a-f* are each adapted to hold a stack of currency bills. Each dispensing receptacle 440*a-f* holds one denomination of currency bill. For example, $1 bills may be stored in dispensing receptacle 440*a*, $5 bills in dispensing receptacle 440*b*, $10 bills in dispensing receptacle 440*c*, $20 bills in dispensing receptacle 440*d*, $50 bills in dispensing receptacle 440*e*, and $100 bills in dispensing receptacle 440*f*. Multiple receptacles may hold the same denomination where volume of use dictates.

In other embodiments, foreign currency bills may be stored in the various dispensing receptacles 440*a-f*. The number of dispensing receptacles 440*a-f* may also be varied depending on the number of different denominations of currency bills to be dispensed.

From the dispensing receptacles 440*a-f*, the currency bills are moved in seriatim from bottoms of the stacks of bills by dispensing mechanisms to a guideway 442 that receives currency bills moving rearward and changes the direction of travel to a downward direction. Although shown as being fed from the bottom, the currency bills can be fed from the top, front, or back of the stack, for example. The type of feeding used could be friction feed, vacuum feed, or any other conventional method of feeding paper. An exit end of the curved guideway 442 directs the currency bills onto a transport plate 444, which carries the currency bills through an evaluation section 445. In some embodiments the evaluation section comprises one or more denomination sensors adapted to retrieve characteristic information which may be used to denominate passing currency bills such as those described. Above and in connection with U.S. Pat. Nos. 5,295,196; 5,687,963; 6,381,354 and published PCT application WO 95/24691, each of which is incorporated herein by reference in its entirety. In other embodiments, the evaluation region additionally or alternatively comprises an image scanner. In some embodiments the evaluation region may comprise one or more authentication sensors or other sensors as discussed above and in connection with FIG. 10 below.

Stacking of the currency bills, in one embodiment, may be accomplished by driven stacker wheels 452, 454 associated with the output receptacles 450*a,b*. The stacker wheels 452, 454 are supported for rotational movement about respective shafts 456 journalled on a rigid frame and driven by a motor (not shown). Flexible blades of the stacker wheels 452, 454 deliver the currency bills onto a forward end of a stacker plate 448.

The document processing system 405 illustrated in FIG. 7 is also able to receive documents for input. An input receptacle 540 is adapted to receive documents, such as currency bills and/or checks, from a user to be deposited into the system 405. The input receptacle 540 may have sides 541 that adjust to accommodate a variety of sizes in checks and/or currency bills. For example, for some foreign currencies, such as the Euro, different denominations of currency bills have different sizes. Also, in the United States, currency bills are of a different size than standard checks. Thus, the input receptacle 540 in this embodiment has adjustable sides 541 to accommodate these variances.

In the embodiment illustrated in FIG. 7, the input receptacle 540 may be adapted to receive only one type of document at a time. For example, an operator may stack the $20 bills in the input receptacle first, then after the process is complete, the operator may stack the $10 bills or checks. In some embodiments, the input receptacle may be adapted to receive a stack of mixed documents such as a mixture of U.S. denominations or a mixture of U.S. denominations and checks. In some embodiments the system may be adapted to sort documents by denomination and type such as for example in FIG. 7 U.S. currency may be delivered to the top output receptacle 450*a* and checks may be delivered to the bottom receptacle 450*b*. Alternatively, the system may be adapted to deliver "on-us" checks to the top receptacle 450*a* and "transit" checks to the bottom receptacle. For example, if the compact document processing system 405 is located at a bank teller station in Bank A, then deposited checks drawn on Bank A would be "on-us" checks whereas checks drawn on another bank, such as Bank B, would be "transit" checks.

During operation, documents placed in input receptacle 540 are moved in seriatim from the input receptacle 540 along a guideway 542 which receives the deposited documents moving rearward and changes the direction of travel to a downward direction. Although shown as be fed from the bottom, the deposited documents can be fed from the top, front, or back of the stack. The type of feeding used could be friction feed, a vacuum feed, or any other method of feeding known to those skilled in the art. An exit end of the curved guideway 542 directs the deposited documents onto the transport plate 444, which carries the deposited documents through the evaluation section 445 to one of two output receptacles 450*a,b*. Stacking of the documents is accomplished as described above.

Once the deposited documents are placed in the output receptacles 450*a,b*, the user may remove them and place them in an appropriate storage receptacle (not shown). The storage receptacles may be divided by document type (currency bills and checks). Currency bill storage receptacles may be further subdivided by denomination and check storage receptacles may be divided by on-us and transit checks. These storage receptacles may be cash drawers, which are similar to those currently used by tellers. In some embodiments, the transport plate 444 may be connected directly to the storage receptacles, allowing for automatic storage of the deposited documents.

According to some embodiments, the document processing system 405 is compact. For example, some embodiments have a height ($H_1$) less than about 40 inches, a depth ($D_1$) less than about 27 inches and a width ($W_1$) of less than about 17 inches. Alternatively, some embodiments have a height ($H_1$) of between about 30 and 40 inches, a depth ($D_1$) of between about 20 and 30 inches and a width ($W_1$) of between about 8 and 20 inches. For example, some embodiments have a height ($H_1$) of about 35 ½ inches, a depth ($D_1$) of about 24 inches and a width ($W_1$) of about 10 inches for embodiments adapted to process currency only and a width of about 12 to 14 inches for embodiments adapted to process commercial checks. An embodiment adapted to process checks may also be adapted to process currency bills.

Some embodiments have a small footprint (depth×width). For example, some embodiments have a footprint of between about 160 and 600 square inches (or about 1.1 square feet to about 4 square feet). Some embodiments have a footprint of less than 460 square inches (or less than about 3½ square feet). Some embodiments have a footprint of about 240 square inches (or about 1.7 square feet) while others have a footprint of between about 288 to 336 square inches (or between about 2 to 2½ square feet).

Some embodiments have a small volume. For example, some embodiments have a volume of between about 4800 and 24,000 cubic inches (or about 2¾ to 14 cubic feet). Some embodiments have a volume of less than 18,400 cubic inches (or less than about 11 cubic feet). Some embodiments have a volume of about 8520 cubic inches (or about 5 cubic feet) while others have a volume of between about 10,000 to 12,000 cubic inches (or between about 5.9 to 6.9 cubic feet).

Figure 8:
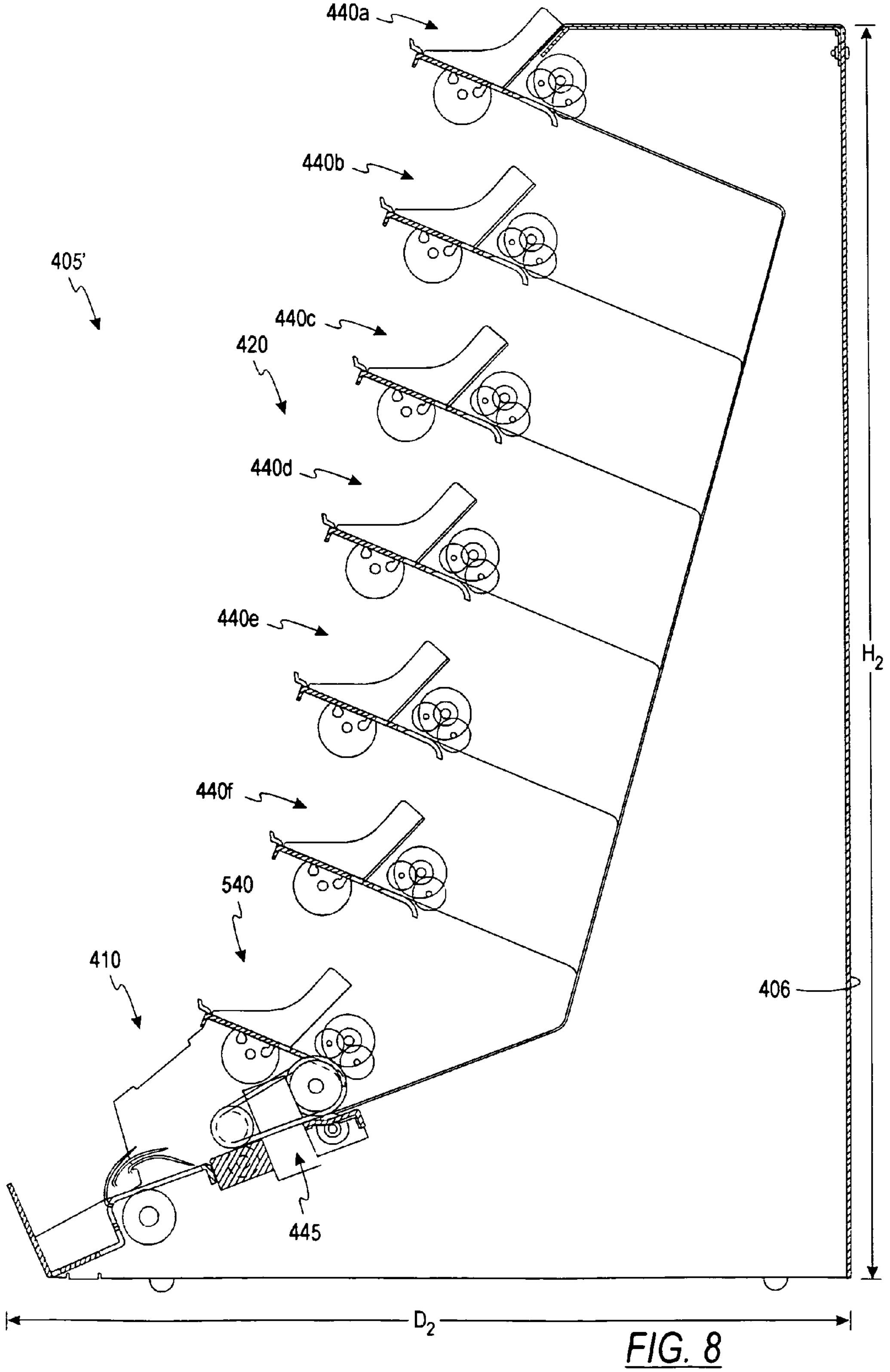
FIG. 8 is a side sectional view of a single output receptacle embodiment of a compact document processing system.

FIG. 8 is a side sectional view of a document processing system 405' similar to the system 405 shown in FIG. 7. The system 405' comprises a housing 406 the evaluation module 410 and dispensing module 420. The housing 406 may be adapted to restrict access to the dispensing receptacles 440 (see, e.g., FIG. 11). In general, the system 405' of FIG. 8 is identical to system 405 of FIG. 7 except that the system 405' of FIG. 8 has one output receptacle while the system 405 of FIG. 7 has two output receptacles.

According to some embodiments, the document processing system 405' of FIG. 8 is compact. For example, some embodiments have a height ($H_2$) less than about 30 inches, a depth ($D_2$) less than about 20 inches and a width ($W_2$) of less than about 17 inches. Alternatively, some embodiments have a height ($H_2$) of between about 25 and 40 inches, a depth ($D_2$) of between about 15 and 30 inches and a width ($W_2$) of between about 8 and 20 inches. For example, some embodiments have a height ($H_2$) of about 29½ inches, a depth ($D_2$) of about 18½ inches and a width ($W_2$) of about 10 inches for embodiments adapted to process currency only and a width of about 12 to 14 inches for embodiments adapted to process commercial checks. An embodiment adapted to process checks may also be adapted to process currency bills.

Some embodiments have a small footprint (depth×width). For example, some embodiments have a footprint of between about 120 and 600 square inches (or about 0.8 square feet to about 4 square feet). Some embodiments have a footprint of less than 340 square inches (or less than about 2½ square feet). Some embodiments have a footprint of about 185 square inches (or about 1.3 square feet) while others have a footprint of between about 222 to 259 square inches (or between about 1½ to 2 square feet).

Some embodiments have a small volume. For example, some embodiments have a volume of between about 3000 and 24,000 cubic inches (or about 1¾ to 14 cubic feet). Some embodiments have a volume of less than 10,200 cubic inches (or less than about 6 cubic feet). Some embodiments have a volume of about 5460 cubic inches (or about 3 cubic feet) while others have a volume of between about 6500 to 7600 cubic inches (or between about 3.7 to 4.4 cubic feet).

In the embodiments depicted in FIGS. 7 and 8, each of the dispensing receptacles has approximately the same dimension, allowing each of the dispensing receptacles 440*a-f* to hold about 300 currency bills. In other embodiments, the dispensing receptacles 440*a-f* may have different dimensions, to allow the dispensing receptacle holding the most popular denomination bills (e.g., $10 and $20) to be larger, and thus, hold more of those currency bills.

A document processing system in accordance with applicant's teachings may comprise a single output receptacle (as illustrated, for example in FIG. 8), two output receptacles (as illustrated, for example in FIG. 7), or three or more output receptacles. Particular systems are directed toward four and six output receptacle designs. The dispensing module may comprise one or more dispensing receptacles. Significant advantages may be realized in using a modular system in accordance with some embodiments of the invention. One such advantage, for both compact and floor-size embodiments, is that the dispensing module can be secured from ready access to reduce theft. Another advantage is that the system 405 can be built up one dispensing receptacle 440 at a time. This build up capability allows the financial institution to customize the system and scale up or down the system as needed.

Figure 11:
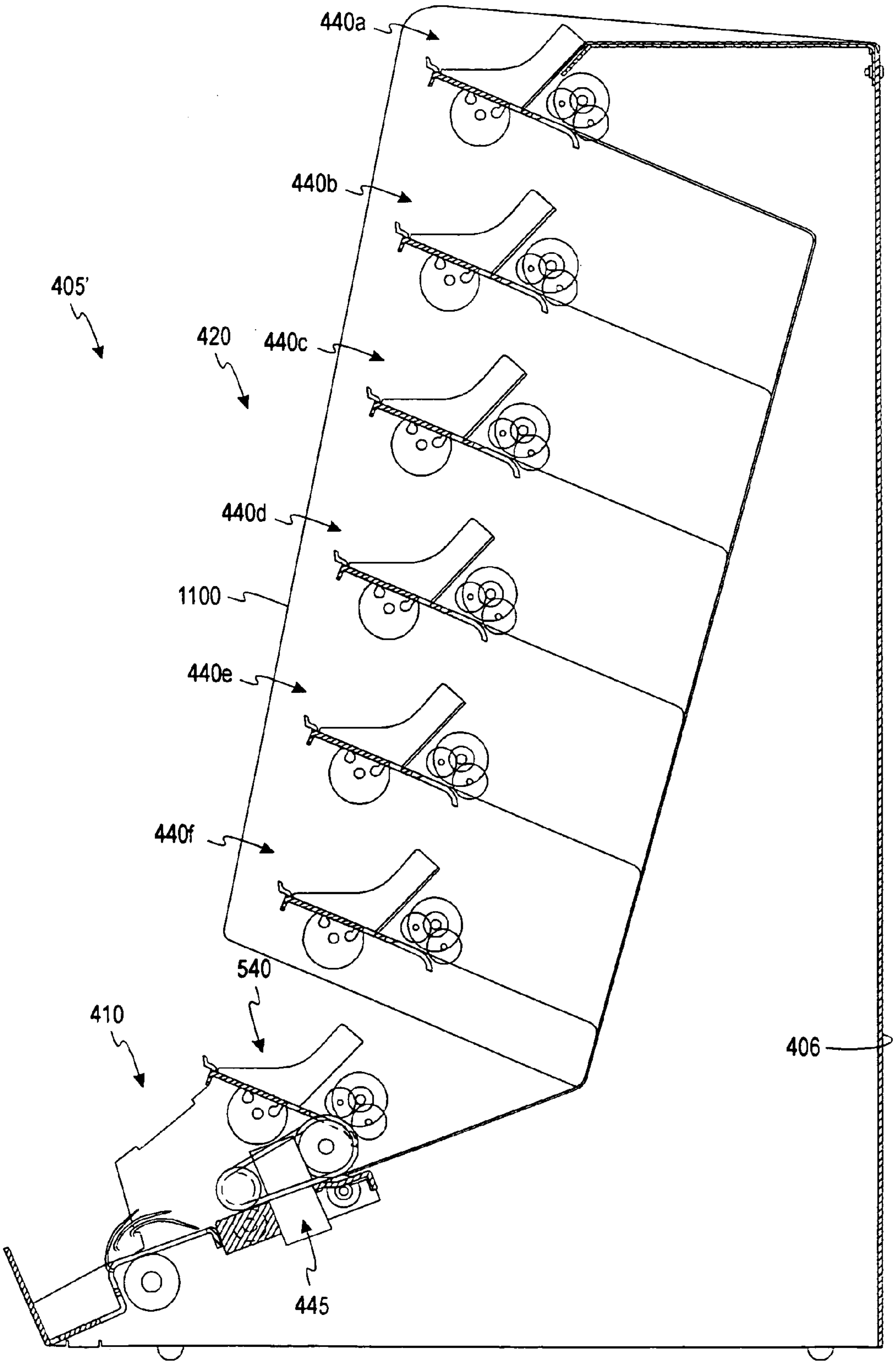
FIG. 11 is a side sectional view of a compact document processing system comprising a barrier around dispensing receptacles.

FIG. 11 illustrates a device in which is identical that that shown and described in connection with FIG. 8 but which additionally includes a barrier 1100 around the dispensing receptacles 440*a*-440*f* which prohibits access to the currency residing in the dispensing receptacles while the barrier is in place. The barrier may be, for example, a cabinet having doors which can be locked. For example, in a bank environment, a manager may be provided a key to the cabinet while bank tellers may not. The barrier thus provides an added means of security and protection of the integrity of the stacks of currency bills residing in the dispensing receptacles. When a barrier is not in place the dispensing receptacles and the contents of the dispensing receptacles are externally accessible to the user of the device. Such a barrier may be added to the other embodiments described in this application such as described in connection with FIG. 7 and the dispensing only embodiments as discussed below.

Alternate embodiments include embodiments similar to those depicted and described about in connection with FIGS. 7, 8 and 11 but which omit the input receptacles 540 thus changing the deposit and dispensing devices described in conjunction with FIGS. 7, 8 and 11 into solely dispensing devices.

Alternate embodiments include embodiments similar to those depicted and described about in connection with FIGS. 7, 8 and 11 but in which the dispensing receptacles 440*a*-440*f* are arranged horizontally behind the evaluation module 410.

Alternate embodiments include embodiments similar to those depicted and described about in connection with FIGS. 7, 8 and 11 but which additionally contain changeable displays adjacent each dispensing receptacle and wherein the devices 405, 405' are adapted to display the denomination of bills contained in each dispensing receptacle. For example, if $1 bills are located in dispensing receptacle 440*a* and $5 bills are located in dispensing receptacle 440*b*, a display adjacent dispensing receptacle 440*a* may read "$1" while a display adjacent dispensing receptacle 440*b* may display "$5". Such an arrangement may be particularly useful when bills of multiple countries are contained within the dispensing receptacles, e.g., "$20" for receptacle 440*a* and "10,000¥" for receptacle 440*b*.

In some embodiments, the evaluation region 445 in FIGS. 7, 8, and 111 does not include an image scanner but rather include sensors adapted to permit the denomination of passing bills to be determined without employing an image scanner. In such embodiments, the evaluation units 410 in FIGS. 7, 8, and 11 may operate as one or more of the embodiments described in U.S. Pat. Nos. 5,295,196; 6,311,819; 5,687,963; 6,381,354 and 6,256,407 and published PCT applications WO 95/24691 and WO 99/48042, each of which is incorporated herein by reference in its entirety. In such embodiments, when bills are to be dispensed, the amount of the currency to be dispensed may be inputted via interface 430, the appropriate number of bills whom the dispensing receptacles 440*a-f* may be transported past the evaluation region 445 and to the one or more output receptacles. As the bills are passed through the evaluation region characteristic information from each bill is obtained and used to denominate the bills. A bank teller, for example, may then take the bills from the one or more output receptacles and provide them to a customer requesting the withdrawal.

As described below in conjunction with FIG. 9, the unit 405, 405' may be coupled to a printer or other device to generate a cash-out ticket or cash-out information. Such an automatic generation of a cash-out ticket can save time and as in balancing a teller's or cashier's drawer at the end of the day or shift. For example, at the beginning of each shift, a unit 405, 405' having a predetermined amount of currency in the dispensing receptacles 440 may be assigned to a given teller. During the teller's shift, the teller provides cash to customers as a result of withdrawal requests. As the result of each dispensing operation, a cash-out ticket is generated either electronically or physically (e.g., printout). At the end of the shift, the amount of currency left in the dispensing receptacles should equal the beginning amount less the total amount dispensed. According to some embodiments, the units 405, 405' may be operated in a clearing or end of shift mode wherein all currency remaining in the dispensing receptacles is dispensed from the dispensing receptacles and into one or more of the associated output receptacles and counted and totaled by the units 405, 405'. The clearing total and then be reconciled with the initial total and the total amount of previously dispensed money. Where the cash-out tickets or amounts are stored electronically, such as in a memory, the units 405, 405' may perform the reconciliation automatically.

As an example, say the initial balance of currency in the dispensing receptacles 440*a-f* at the beginning of a teller's shift is $21,800 (e.g., made of 300 notes of $1 bills in one dispensing receptacle, 300 notes of $5 bills in another dispensing receptacle, 300 $10 bills in another dispensing receptacle, 600 $20 bills in two of the dispensing receptacles, and 100 $50 bills in another dispensing receptacle). During the teller's shift, the teller operates the unit during 50 dispensing transaction during which $16,555 are dispensed. Accordingly, at the end of the shift it expected that $5,245 remains in the dispensing receptacles. Using the clearing mode, all remaining bills are dispensed. If they total $5245 (as may be indicated via interface 430), the teller is in balance and the reconciliation process is complete. Where cash out tickets are electronically maintained (either individually and/or as a running total), the unit 405,405' may automatically indicate a correct reconciliation. Of course, processors and/or memories external to the units 405, 405' ma be used (e.g., where the units 405, 405' are coupled to an external computer system) and the external processors and/or memories may receive cash-out information (and/or cash-in information as discussed below) and/or perform the reconciliation process.

When a customer provides a teller with a stack of currency to be deposited, the teller may insert the stack in the input receptacle 540 and the unit 405, 405' transports the bills past the evaluation region to one or more of the output receptacles. The total amount of the deposited currency (and/or a breakdown of the number and/or value of bills of each denomination) is calculated by the unit 405, 405'. The unit may then generate a cash-in ticket or information as discussed in more detail below, e.g., in connection with FIG. 10. The cash-in ticket or information may be generated in electronic and/or physical form such as a printed cash-in ticket.

In some embodiments, the teller may then store the deposited currency in his or her cash drawer until the end of his or her shift. The reconciliation process described above may also include a reconciliation of the amount of money expected to be in the teller's drawer. For example, separately or in connection with the reconciliation process discussed above, the unit 405. 405' may be place into a deposit reconciliation mode during which the teller may remove all the currency bills from his or her cash drawer and insert them into the input receptacle 540. The units 405, 405' then process the bills and total the amount of currency bills inserted into the input receptacle 540. If the total amount equals the expected amount (based on the cash-in tickets or information accumulated during the teller's shift, then the teller's cash drawer is in balance. Such procedures help expedite the reconciliation process conducted at the end of each teller and cashier shift. Similar processes can be performed at the beginning of each shift.

In some embodiments, the evaluation region 445 in FIGS. 7, 8, and 11 comprises an image scanner. In such embodiments, the evaluation units 410 in FIGS. 7, 8, and 11 may operate as one or more of the embodiments described in U.S. provisional application serial No. 60/350,588 filed Jan. 22, 2002 and corresponding U.S. application Ser. No. 10/348,819 filed Jan. 22, 2003 and entitled "Financial Institution System." each of which is incorporated herein by reference in its entirety. Accordingly to some embodiments containing such an image scanner, the image of every. Document of a deposit transaction-maybe image and that image may be stored for subsequent retrieval and recreation (e.g., the image a previously deposited currency bill or check may be recreated and printout out of a customer's statement). Likewise, as discussed in more detail in the above mentioned applications, information may be extracted from various fields on deposited documents (e.g., a currency bills serial number, the amount of a check) and that information tagged to the image of the document. Likewise, information associated with the person depositing the documents (e.g., the account number associated with a deposit transaction) may be tagged to the image file and/or otherwise maintained. The image and/or the extracted information may be electronically stored in such a manner that it can be subsequently searched and retrieved. For example, if a bank later learns that a bill that it has received was counterfeit (e.g., by notification from the Federal Reserve), the bank can search its database for currency bills having the serial number on the discovered counterfeit bill. When a match is found, by cross-referencing the serial number to the person or account which deposited the bill, the person or account who deposited the bill can be identified and the bank can then charge the amount of the counterfeit bill back to the person or account associated with the deposit transaction.

In embodiments wherein every deposited document is imaged and that image is stored for subsequent retrieval, a customer making a deposit may be provided (electronically and/or physically) with an image of every document deposited. This can enhance customer satisfaction and assist if any dispute about a deposit subsequently arise. In some embodiments, the documents inputted into the input receptacle 540 from deposit and imaging may include a deposit slip, checks, and currency bills.

In other embodiments, only some deposited documents are imaged and/or the image of the some of the deposited documents are stored for subsequent retrieval. For example, in some embodiments, the image of every check deposited is stored while the images of currency bills are not.

In some embodiments of FIGS. 7, 8, and/or 11 employing an image scanner, some or all of the currency bills dispensed during a dispensing transaction may additionally or alternatively be imaged. For example, bills identified as suspect or no call could be imaged while others are not.

In some alternative embodiments of a document deposit device, such as embodiments similar to those discussed in. Connection with FIGS. 7, 8, and 11, the device comprises both one or more denominating sensors (e.g., denominational determination as described above in connection with FIG. 6) for denominating deposited currency bills and an image scanner for imaging deposited checks. The images of checks may be either handed off for downstream processing (e.g., OCR) or processed on-board the document deposit device in which case images and/or extracted alpha-numeric data may be transmitted from the device to one or more other computer systems.

According to some embodiments, the document processing device (deposit and/or dispensing device) operates at at least 800 documents per minute. In other embodiment, the document processing device operates at about 1500 documents per minute. For example, devices such as those discussed in connection with FIGS. 7, 8, and 11 and which denominate currency but not an image documents operate at 800 to 1500 bills per minute. Alternatively, in some embodiments of devices such as those discussed in connection with FIGS. 7, 8, and 11 and which image documents, operate at 400 to 600 documents per minute.

Alternatively, in some embodiments of devices such as those discussed in connection with FIGS. 7, 8, and 11 and which include both one or more denominational sensors and one or more image scanners and which simply denominate but do not image currency bills and which image non-currency bills (e.g., checks), such devices may operate at one than one speed, for example, one speed when currency denomination is being performed (e.g., a first speed of 800 to 1500 documents per minute) and at a second slower speed when document imaging is being performed (e.g., a second speed of 400 to 600 documents per minute). In some such embodiments, when a currency bill is determined to be a suspect it is also imaged and the transport mechanism is reduced from the first transport speed used to transport the bill past one or more authentication sensors to the second slower transport speed so as to route the suspect document past a downstream image scanner at the second transport speed so that it may be imaged Alternatively, when a bill is identified as being suspect while operating at the first speed, the device may prompt the operator to insert the bill into input receptacle 540 and the device may subsequently process the suspect bill in a second pass at the second speed wherein the bill is imaged during the second pass.

Figure 9:
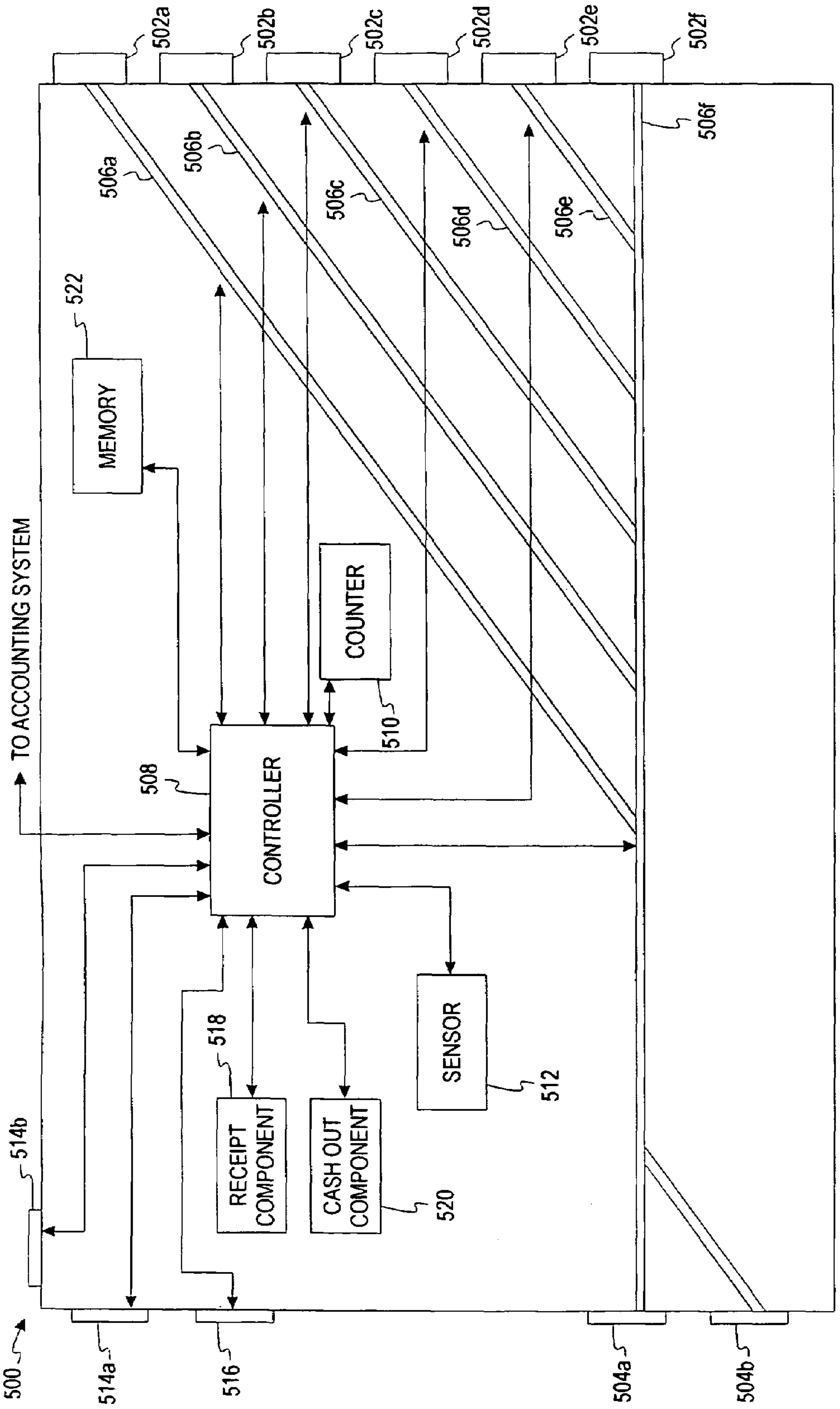
FIG. 9 is a block diagram of a currency dispensing device according to another embodiment of the present invention.

Turning now to FIG. 9, a block diagram of one embodiment of a currency bill dispensing device 500 is shown. The currency bill dispensing device 500 includes dispensing receptacles 502*a-f*. As discussed above in reference to FIG. 1, the dispensing receptacles 502*a-f* hold currency bills for disbursement to an operator. In the illustrated embodiment, there are six dispensing receptacles 502*a-f*. In some embodiments, each dispensing bin may include different countries' currencies. This would be especially useful for banks and/or other locations that often exchange foreign currency. For example, the first dispensing bin 502*a* may hold British pounds, the second dispensing bin 502*b* may hold French Francs, etc. The dispensing receptacles 502*a-f* are connected to the output receptacles 504*a,b* via a transport mechanism 506*a-f*.

A processor or controller 508 is operatively coupled to the dispensing receptacles 502*a-f* and transport mechanism 506*a-f* for controlling the operation of the device 500. The controller 508 operates in the same manner as described above in reference to FIG. 1.

Also connected to the controller 508 is a counter 510. The counter 510 counts the number and denominations of the currency bills being dispensed from the dispensing receptacles 502*a-f*. The counter 510 communicates with the controller 508 to inform the controller 508 that the correct number of currency bills are dispensed. Also, the counter 510 may be used in some embodiments to keep a running total of the number of currency bills dispensed from each dispensing receptacle 502*a-f* over the course of a particular period of time. In these embodiments, the operator can be notified when the dispensing receptacles 502*a-f* are low on currency bills or are empty.

A sensor 512 is placed along the path the currency bills are transported, between the dispensing receptacles 502*a-f* and the output receptacles 504*a,b*. The sensor 512 may be any variety of sensor (e.g., optical, magnetic, etc.) and may comprise one or more sensors. The sensor 512 may be used to denominate and/or authentic currency and/or may comprise an image scanner to image documents. As discussed above, a variety of characteristics may be detected from documents such as size. Or thread detection. In some embodiments, the sensor 512 is a denominating sensor similar to that discussed above, for example, in connection with FIG. 6. In others, the sensor 512 is an image sensor similar to that discussed above, for example, in connection with FIG. 5. In some embodiments, sensor 512 may comprise both a denominating sensor and an image scanner as discussed above.

One or more sensors may also be included to authenticate currency bills being dispensed to the customer. In other embodiments, one or more sensors may be included to ensure that doubles, or bills stacked on top of one another, are not dispensed to the customer or that they are correctly counted. The sensor 512 may be used as a denominator to ensure that the correct denomination of currency bills is being dispensed. If the sensor 512 is an image scanner, then, in some embodiments, the sensor 512 operates in the same manner as the image scanner described in FIG. 1.

The sensor 512 may also be connected to the counter 510 and update the counter 510. For example, if the sensor 512 indicates that the last currency bill that was sensed was really two documents (e.g., doubles), the sensor 512 can update the counter 510 to reflect that two documents were dispensed instead of one. This way, the counter 510 can keep an accurate track of all of the bills dispensed, even if doubles are dispensed. This saves time, since the operator does not have to stop the device if doubles are sensed or rerun the request. The device will automatically update itself and continue processing bills.

Also included in this embodiment are display screens 514*a*, 514*b* and an entry apparatus 516. The entry apparatus 516 allows the operator to enter instructions (such as a withdrawal request, including amount and/or type) into the dispensing device 500. The entry apparatus 516 may be any one or more of a keypad, a keyboard, denomination keys, touch screen, and/or any other entry device. The display screens 514*a*, 514*b* allow both an employee and a customer to view the entered instructions and any feedback from the controller 508. For example, the operator may input a withdrawal request for $100 and the display screen may ask for verification of the amount or in what denominations the operator would like the amount disbursed.

The display screens 514*a*, 514*b* may also be used to view images of the dispensed currency bills. If the sensor 512 is an image scanner, and for some reason, the controller 508 is unable to read an image of a particular currency bill, the image scanner may flag that bill as a no call bill. The display screens 514*a*, 514*b* may display the image of a no call bill and provide the operator the opportunity identify and enter the denomination of the currency bill. The operator can then use the entry apparatus 516 to enter in missing information or information that could not be read by the device.

The device of FIG. 9 may also include a receipt component 518 and/or a cash out component 520. The receipt component 518 provides the operator and/or customer with a receipt of the transaction. The receipt component 518 may be a printer that prints a receipt for the customer. The receipt may include only a summary of the transaction, such as the amount withdrawn and the current balance in the relevant account. Alternatively, the receipt may also include copies of images of the withdrawn currency bills and/or a break down of how many of each denomination of currency bill was withdrawn. In alternative embodiments, the receipt component 518 may be a disk, a CD-ROM, tape, or other memory storage device that obtains an electronic copy of the receipt and stores it for the operator. The receipt may also be e-mailed to the customer or downloaded onto a handheld device. Download to the handheld can be based on a standard, for a example an InfraRed Data Association standard.

The cash out component 520 of this embodiment of the present invention is designed to create cash out tickets. Cash out tickets are often used by operators such as tellers to balance their cash drawers at the end of the day. The teller, for example, generates this ticket with every transaction to indicate that funds were removed. The cash out tickets generally act as a receipt for the employee at the end of the day or when the system needs to be balanced. Currently, most tickets must be manually produced by the employee of the bank. The employee hand writes or types the amount of money disbursed from the system. All the cash out tickets are totaled at predetermined periods, such as at the end of a shift or work day, and compared against the amount actually disbursed from the system.

The cash tickets can be automatically created by the system printed and/or downloaded for later use, in for example an automated processing method. The cash out tickets could be printed, and the dispenser could be. Manually balanced as in prior systems, or the cash out tickets could be downloaded and could automatically balance the currency bills in the dispenser at predetermined times. This saves time for the employee, usually a teller, allowing for quicker balancing of the device. Also, errors are reduced since the device automatically produces the record reducing the likelihood of a mathematical or transcribing error from occurring.

Also operatively coupled to the controller 508 is a memory 522. The memory 522 may be adapted to store information from the counter 510, the sensor 512, and/or the cash out component 520. The memory 522 may store the information from the counter 510 regarding how many of each denomination has disbursed. Additionally, the memory 522 may also store master denominating and authenticating information, against which information obtained from processed bills (e.g., images, scans, magnetic, etc.) is compared. The memory 522 may also store how many of each denomination were initially input into the dispensing receptacles 502*a-f*. This information may be used by the controller 508 to inform the operator when any of the dispensing receptacles are empty or nearly empty. The information output by the cash out means 520 may also be stored in the memory for later downloading and/or reviewing by the operator.

An example of the operation of the dispensing device 500 of FIG. 9 will now be described. First, an operator, such as a customer or an employee, inputs a withdrawal request into the device 500 via the entry means. The withdrawal request may include a withdrawal amount and an account to be debited for the funds about to be dispensed. The withdrawal request may also include a PIN or other security access code. If the operator would like specific denominations or combinations of denominations withdrawn, the withdrawal request would also include this information.

The entry means communicates the withdrawal request to the controller 508 for processing. The controller 508 may be communicatively coupled to an outside accounting system (not shown) and communicates with the outside accounting system to verify the details of the withdrawal request. For example, the outside accounting system may verify that the PIN corresponds to the account number entered. Also, the outside accounting system may verify that there are sufficient funds to cover the withdrawal amount in the designated account. Once these have been verified, the outside accounting system will provide approval to the controller 508 to proceed with the operation.

The controller 508 then transmits an instruction to the appropriate dispensing receptacles 502*a-f* to begin dispensing currency bills onto the transport mechanism 506*a-f*. The transport mechanism 506*a-f* will begin moving, carrying the currency bills, one at a time, from the dispensing receptacles 502*a-f*, past the sensor 512 and the counter 510. When a currency bill is being transported past the sensor 512, the sensor 512 retrieves characteristic information from passing bills and sends a corresponding characteristic information signal to the controller 508. The processor or controller 508 may then use the characteristic information signal to discriminate the denomination and/or authenticity of bills being dispensed by at least one of the methods described above. If the device 500 cannot discriminate a currency bill, the currency bill is flagged.

In some embodiments, when currency bills are flagged as being "no call" bills, they are transported to the second output receptacle 504*b*. This way, the bills that are unable to be discriminated are kept separate and the controller instead causes other bills to be dispensed to the operator for disbursement to the customer or person making the withdrawal request, e.g., denominated bills are routed to the first output receptacle 504*a*. The controller 508 can then accurately dispense the correct number of bills. In other embodiments, if a no call bill is discovered, the system may halt, leaving the no call bill at a predetermined location for removal and inspection by the operator.

In addition to being discriminated by the sensor 512, the currency bills are also transported past the counter 510. The counter 510 is in communication with the controller 508 and may receive instructions from the controller 508 as to when to begin counting bills. The counter 510 uses a sensor of its own and the information from the sensor 512 to count the currency bills that are transported past. The counter 510 provides the controller 508 with a total number of bills dispensed to the user, the total number of bills dispensed of each denomination, the total number of no call bills, and the dollar amount of the bills dispensed. This information is useful to confirm the amount that was dispensed and also to keep track of how many bills were dispensed from each dispenser 502*a-f*, so as to info m an operator when any of the dispensers 502*a-f* need refilling. In some embodiments the functions of the counter 510 can be performed by the one or more sensors 512 and hence the separate counter 510 may be omitted.

According to some embodiments, the controller 508 may transmit at least the amount actually disbursed to the customer to the outside accounting system. The outside accounting system then updates the appropriate account such as by debiting the account of the customer to whom bills are dispensed. The controller 508 also transmits the total amount disbursed to the cash out component 520 and the receipt component 518. The cash out component 520 uses the total to create an internal receipt for the controller 508. As discussed above, the cash out component 520 may create either a paper or electronic cash out ticket that enables the dispensing device 500 to balance itself at the end of a predetermined period of time.

The receipt component 518 may create an external receipt for the customer. The receipt component 518 may take the information from the controller and prepare a receipt for the customer to take away with them as confirmation of the transaction. As stated above, the receipt means 518 may create the receipt in a paper and/or an electronic format.

Figure 10:
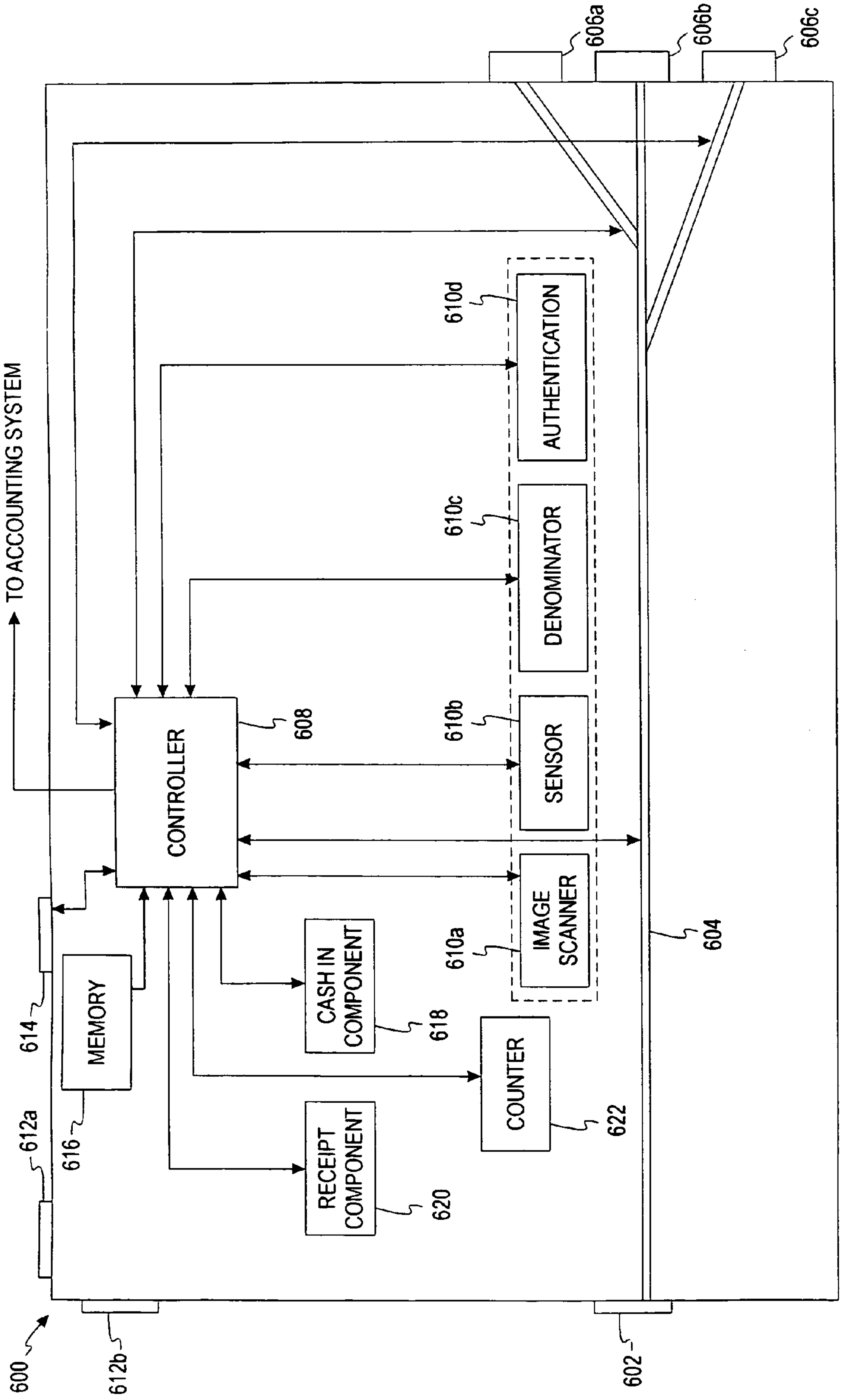
FIG. 10 is a block diagram of a deposit device according to one embodiment of the present invention.

In some embodiments, the dispensing device 500 is linked to a deposit device. In FIG. 10, one embodiment of a deposit device 600 according to such an embodiment is shown. The deposit device 600 includes an input receptacle 602, a transport mechanism 604, and a plurality of storage receptacles 606*a-c*. The input receptacle 602 receives a stack of documents—e.g. currency bills, checks, and/or other documents. The documents may be sorted by type (currency bills first, then checks), or the documents may be mixed. The transport mechanism 604 transports the documents, one at a time, along a transport path, from the input receptacle 602 to one of the storage receptacles 606*a-c*.

Connected to the transport mechanism 604 is a processor or controller 608. The controller 608 acts similarly to the controller described in FIGS. 1 and 9. Namely, the controller 608 is used to direct the movement of the documents from the input receptacle 602 to the storage receptacles 606*a-c*.

The controller 608 is also connected to a sensing device 610. The sensing device 610 is used to identify the types of documents being input into the deposit device 600. In the illustrated embodiment, the sensing device 610 includes four different detection devices an image scanner 610*a*; a sensor 610*b*; a denominator 610*c*; and an authenticator 610*d*. The image scanner 610*a* obtains images of the documents and identifies the documents based on these images. For example, as a document passes by the image scanner 610*a* on the transport mechanism 604, the controller 608 communicates with the image scanner 610*a*, and instructs the image scanner 610*a* to obtain an image of the document. The image may be stored for later use, such as in a statement verifying that the document was deposited. The image may be used to determine the type of the document being deposited. Likewise the image may be used to denominate or obtain the value of the document, or for other reasons.

Also included in this embodiment is a sensor 610*b*. The sensor 610*b* may be used to measure the width or size of an item deposited, and/or otherwise determine the type of document that is being deposited. A denominator 610*c* is also included to denominate currency bills that are deposited into the input receptacle 602. The denominator 610*c* may use magnetic tests, optical imaging, UV imaging, infrared imaging, thread tests, or other known denomination techniques to denominate the deposited currency bills.

The authenticator 610*d* is used to confirm the authenticity of the document. When authenticating currency bills, the authenticator may use many of the same tests as mentioned above in the denominators 610*c*. Alternatively, the authenticator 610*d* may use pattern detectors to detect the pattern of the bill and compare the detected pattern to a stored pattern for authenticity. For other types of bills, other authenticating techniques—MICR line reading, testing for waterspots—may be used in addition to the tests described above.

The depositing device 600 includes display panels 612*a*, 612*b* and an entry means 614. The display panels 612*a*, 612*b*, and the entry means 614 are similar and are used in a similar fashion as the display panels 518*a*, 518*b*, and entry apparatus 520 described in reference to FIG. 9. As discussed above, the entry means 614 may be any combination of a keypad, keyboard, denomination keys, touch screen, and/or any other known information entry devices.

A memory 616 is also included in the depositing device 600 and is in communication with the sensing device 610. The sensing device 610 obtains images or information from the documents being input into the depositing device 600 and then may transmit the information to the memory 616 for storage; The memory 616 may be used to store information regarding counterfeit documents. For example, it is not uncommon for many counterfeit currency bills to have the same serial number. The memory 616 may be used to store lists of serial numbers associated with counterfeit bills. The controller 608 is then used to compare the serial numbers stored in the memory 616 with a serial number extracted from the input currency bill. The memory 616 may also be used to store other information useful in detecting counterfeits such as images of genuine bills for comparison with deposited documents.

Also the controller 608 may also be coupled to a cash in component 618 and a receipt component 620. The receipt component 620 may operate in the same way as the receipt component of FIG. 9. The cash in component 618 operates under the same principles as the cash out means of FIG. 9, but instead records information about documents that are deposited into the device instead of currency bills that are dispensed.

A counter 622 may also be connected to the controller. The counter 622 may count the number and denominations of the currency bills being transported by the transport mechanism 604. The counter 622 communicates with the controller 608 to verify number of currency bills being accepted. Also, the counter 622 may be used in some embodiments to keep a running total of the number of currency bills being transported into each of the storage receptacles 606*a-c*. In these embodiments, the operator can then be notified when the storage receptacles 606*a-c* are full or nearly full and need to be emptied.

Now, an example of the operation of the deposit device 600 will be described. First, the operator who in some embodiments may be a customer or an employee inputs a deposit request via the entry means 614. The deposit request may include a deposit amount, the account to be credited with the deposit, and possibly a PIN or other security access code. A security access code is useful in ATM applications, unattended applications as well as attended applications. The security access code may be used to provide a convenient method of transaction tracking rather than, or in addition to, restricting access to currency. Also, the deposit request may include a breakdown of the deposit, such as how much being deposited is cash and how much is in the form of checks.

The deposit request is transmitted to the controller 608. In some embodiments, the controller 608 may be coupled to an outside accounting system (not shown) and the controller may communicate with the outside accounting system in order to obtain verification the details of the deposit request. The outside accounting system may verify that the account number is valid and if a PIN is; given, that the PIN relates to the account number provided.

Once the information is verified, the controller sends a signal to the transport mechanism 604 to begin operation. The transport mechanism 604 begins moving, causing the documents stacked in the input receptacle 602 to move into the deposit device 600.

As the transport mechanism 604 transports the documents from the input receptacle to the storage receptacles 606*a-c*, the documents pass by the four different evaluating means described above. First, the documents are transported, one by one, past the image scanner 610*a*. In some embodiments, the image scanner 610*a* may receive an instruction from the controller when the document is being transported by to obtain a image of the document. The image of the document may then be stored in the memory 616.

The documents are then transported, one at a time, past a sensor 610*b*. The sensor 610*b* is also operated by the controller and may be of a variety of types. The sensor 610*b* may be a size sensor, and thus used to determine the type of document being deposited. For example, U.S. currency bills are of a different size than standard U.S. checks. A size sensor may be able to tell the type of document, at least preliminarily, merely by being able to measure its size. Furthermore, in many foreign countries, such as Germany and the United Kingdom, the currency bills vary in size depending on the denomination. A size sensor used in conjunction with such foreign currency bills may also operate as a denomination discriminator, distinguishing between different denominations of bills. The information from the sensor 610*b* is also transmitted to the memory 616 and/or controller 608 for storage and later use.

After being transported past the sensor 610*b*, the document is then transported past the denominator 610*c*. The denominator 610*b* is also connected to the controller 608 and may receive instructions as to when it should begin operation. In some embodiments, the controller 608 will only instruct the denominator 610*c* to operate when currency bills are being transported past—since the denominator 610*c* is unable to denominate checks. Because the document has already passed by the image scanner 610*a* and the sensor 610*b*, the type of document is already known. Thus, the controller 608 may only instruct the denominator 610*c* to retrieve characteristic information as a currency bill is about to pass by the denominator 610*c*. Denominating the currency bills may be used to verify the amount of currency that is actually deposited, in comparison to the amount that may have been declared (via the entry means 614) to be deposited. The denominator 610*c* may use any means to denominate bills such as those discussed above, e.g., magnetic tests, optical detection, UV imaging, infrared imaging, thread tests, or other commonly known denomination techniques to denominate the deposited currency bills. If, for whatever reason—tears, doubles, no call, suspect—the currency bill cannot be deposited, the currency bill is flagged. In one embodiment, the transport mechanism 604 will cease operating, causing the flagged bill to stop in a predetermined location. The operator may then remove the flagged bill and examine the bill to determine what the denomination is and whether to accept the bill. In other embodiments, the flagged bill is transported to a particular one of the storage receptacles 606*a* that is designed specifically to receive flagged documents.

The document is then transported past an authenticator 610*d*. The authenticator 610*d* is also in communication with the controller 608, and may receive instructions from the controller 608 as to when to begin operation. According to one embodiment, the authenticator 610*d* is used with all types of documents. For example, the authenticator 610*d* receives information from the controller 608 indicating what type of document it is looking for (i.e. a check or a specific denomination of currency bill). The authenticator 610*d* then uses that information to determine what type(s) of tests should be performed on the passing document to determine the documents authenticity. For example, if the document being passed is a check, the authenticator would use a MICR reader to read the MICR line. If the MICR line is absent or incorrectly coded, then the check would be deemed a fake and labeled as a flagged document. As in the flagged documents described above, the transport mechanism 604 may cease operation and allow the operator to pull the check out of a specific location, or the flagged check may be transported to one of the storage receptacles 606*a-c* as described above. The MICR-failed check can then be read by a human to determine the correct information. If the check passes the authentication test, it is then transported to the storage receptacle 606*b* for storage.

If the document is a currency bill, the authenticator 610*d* may use any variety of sensors or techniques to authenticate the bill as discussed above. If a bill fails an authentication test, the currency bill is a suspect bill, and may be treated as the flagged documents described above.

After all of the documents have been evaluated by the various evaluation means and sorted into the different storage receptacles 606*a-c*, where appropriate, the controller 608 may transmit the information received from the evaluation means to the outside accounting system, cash in means 618, and receipt means 620. The controller 608 receives information pertaining to the number of documents deposited, the total amount of the documents deposited, the number and denomination of currency bills deposited, the number and value of checks deposited, the number of no call bills and checks, and/or the total amount of authenticated and properly discriminated checks and currency bills, etc. The outside accounting system uses the total of properly discriminated and authenticated checks and currency bills to update the account identified in the deposit request. The cash in component 618 is used similarly to the cash out means described above, and acts as an internal receipt for the deposit device, making balancing simpler and more efficient. The receipt component 620 may be used in the same manner as the receipt component 520 described in reference to the dispensing device and creates a record for the customer. In some embodiments, the receipt means 620 in the present embodiment allows the customer to see which checks and currency bills did not get immediately deposited and why. This is extremely useful in decreasing customer dissatisfaction. The customer knows almost immediately what the final deposit amount will be and why it may differ from the amount declared as the deposit amount.

Of course, not all sensors 610*a*-610*d* need be included in all embodiments, but rather it is contemplated that some of these sensors may be omitted in different embodiments (e.g., depending on the needs of a particular application). Likewise, as described above, the functionality of these various sensors may be combined. For example, based on the scanned image of a document using image scanner 610*a*, a document may be discriminated as to type (e.g., check vs. currency bill) and/or denomination or value (e.g., check amount). Likewise, the size of a document may be determinable using the information retrieved for the image scanner and/or such information may be used to authenticate the documents. Accordingly, one or more of the sensors 610*b*-610*d* may be omitted. Likewise, in some embodiments, the ability to perform certain functions such as authentication and/or imaging may be omitted and thus the sensors otherwise needed to perform such functions may be omitted. For example, in some embodiments designed to only process currency bills, the image scanner may be omitted while in others an; image scanner may be included.

Likewise, the arrangement of the sensors 610*a*-610*d* may be varied.

In some embodiments, it is contemplated that the deposit device and the dispensing device are connected and are used in connection with each other. Such devices are useful, because a customer can make both deposits and withdrawals at the same location and also, the financial institution needs to only purchase one machine, which is less costly and also takes up less space. In the deposit and dispensing combination devices, the operation of the devices are the same as the two described above, with the exception that an operator may only have to input one transaction request which may include both deposit and withdrawal requests. This also saves time for the customer, in that it will take less time and the customer only has to enter information once.

In some embodiments, the data in the memory 616 may be used to subsequently track the deposited documents back to the person who deposited them and/or to the account to which they were deposited. This is helpful if a currency bill is later returned as or determined to be counterfeit. For example, using the data stored in memory such as the stored images of deposited documents and/or extracted serial number data and account number data linked to a stored document image or serial number, the bank or other institution can correctly debit the party who deposited the subsequently discovered counterfeit for the counterfeit and not have to bear the loss. The tracking procedure is more fully described in commonly owned U.S. patent application Ser. No. 09/965,428, filed on Sep. 27, 2001, and herein incorporated by reference in its entirety. Also, the image stored in the memory 616 may also be used for receipt purposes, or to prove a deposit at a later date.

In some embodiments containing both a deposit device and a withdrawal device, such as that described in connection with FIGS. 9 and 10, components the devices may be shared. For example, the devices depicted in FIGS. 7 and 8 may function both as a deposit device and a dispensing device. In these devices, many of the components such as portions of the transport mechanism, the evaluation sensors, and the output receptacles may be used during both a deposit and a dispensing operation.

The systems and devices discussed above can also be used for currency conversion. For example, the device can be adapted to accept a deposit in U.S. dollars and dispense a corresponding amount of a foreign currency or substitute currency. Alternatively, an amount to be dispensed can be specified in U.S. dollars and the device can then dispense a corresponding amount of a foreign currency or substitute currency. For example, during a conversion transaction, a customer may provide a teller $300 (U.S.) and request the equivalent amount of Japanese yen. The operator could enter $300 into the device and request dispensing of an equivalent amount of Japanese yen, taking into account the current exchange rate. Using the device of FIG. 9 as an example, the processor or controller 508 would be programmed to make the necessary exchange calculation and to automatically dispense an appropriate amount of Japanese yen from the appropriate dispensing receptacles 502*a-f*.

Using a multiple-stacker configuration such as in FIG. 7, for example, an automated currency conversion system can be provided. For example, deposited US dollars could be placed in input receptacle 540 of FIG. 7. The bills could then be transported through the machine, denominated (e.g., in evaluation section 445), totaled and restacked in output receptacle 450*b*. Subsequently, an appropriate amount of foreign currency residing in one or more of dispensing receptacles 440*a-f* could be dispensed into output receptacle 450*a*—the dispensed currency also being denominated in, e.g., evaluation section 445 prior to being dispensed into the output receptacle 450*a*.

Some additional embodiments contemplated by the device will now be described. For ease of understanding, the embodiments will be labeled A through K.

Alternate Embodiment A

In this embodiment, a currency processing system for processing currency to be deposited and withdrawn from a financial account comprises an entry device. The entry device is adapted to accept a customer identification number that associates a customer to a financial institution account. The entry device is further adapted to accept transaction information, which includes both withdrawal and deposit amounts. Also included in the system is a deposit device that is adapted to denominate each of a plurality of currency bills that are inserted into the deposit device. The deposit device has an image scanner that obtains images of the dispensed bills and obtains a denomination of the dispensed bills based on the images. The currency processing system also includes a currency dispenser that has a dispensing receptacle that dispenses a requested number of currency bills to an output receptacle and has a denomination discriminating unit. The denominating discriminating unit includes a detector and a processor. The detector generates a characteristic information output signal in response to detected characteristic information. The characteristic information output signal is electrically coupled to the processor and the processor receives the characteristic information output signal and generates a denomination signal in response. The processor also associates each deposit amount with the financial account into which the currency bills are deposited.

Alternate Embodiment B

In this embodiment, a document deposit and withdrawal processing system comprises an input receptacle that receives a plurality of documents to be deposited. At least one of the deposited documents has a value associated with it. The system also includes a storage receptacle for receiving the plurality of documents to be deposited and a scanning system to scan at least a portion of the deposited and to obtain the value of the deposited documents. To transport the documents from the input receptacle, past the scanning system, and to the storage receptacle, a transport mechanism is included. Further included in the system is a dispensing receptacle for holding a plurality of currency bills and an output receptacle for receiving the currency bills form the dispensing receptacle. The transport mechanism transports the documents from the dispensing receptacle, past the scanning system and to the output receptacle. The scanning system denominates the dispensed currency bills. To obtain a deposit amount—the sum of the value of the deposited documents—a processor is also included and is in communication with the scanning system. The processor also obtains the withdrawal amount—the sum of the denominations of the dispensed currency bills. The deposited amount and the withdrawal amounts are all stored in a memory that is coupled to the processor.

Alternative Embodiment C

This embodiment includes a document deposit and withdrawal system comprising a deposit device, a currency bill dispenser, a user interface, and a processor. The deposit device includes an input receptacle for receiving a plurality of documents to be deposited and at least one storage receptacle adapted to receive the plurality of deposited documents. A scanning transport mechanism transports each of the plurality of deposit documents, one at a time, from the input receptacle, past a scanner, and to the at least one storage receptacle. The scanner scans at least a portion of the deposited documents.

The currency bill dispenser includes a plurality of dispensing receptacles, each of the dispensing receptacles holding a plurality of currency bills having the same denomination. Different dispensing receptacles hold currency bills of different denominations. The currency bill dispenser also includes an output receptacle and a dispensing transport mechanism that transports currency bills, one by one, from the dispensing receptacles and tot he output receptacle. The currency bill dispenser also includes a counter that counts the number and denomination of the currency bills that are being disbursed from the dispensing receptacles.

The user interface receives information from a user and is in communication with the processor. The processor is also in communication with the currency bill dispenser and the deposit device. The processor converts information received by the user interface into commands to at least one of the currency bill dispenser and the deposit device.

Alternative Embodiment D

In this embodiment, a currency processing system for processing currency bills to be withdrawn and currency bills to be deposited, comprises a currency bill dispenser having a plurality of dispensing receptacles. Each of the dispensing receptacle holds a plurality of currency bills, and each of the dispensing receptacles only holds one denomination of currency bill. The currency bill dispenser also includes an output receptacle for receiving the dispensed currency bills and a first scanner for obtaining images of at least a portion of a currency bill that is dispensed. The first scanner is also used to denominate the dispensed currency bill. A dispensing transport mechanism transport the dispensed documents from the plurality of dispensing receptacles, past the first scanner and to the output receptacle.

The currency processing system also comprises a deposit device that includes an input receptacle for receiving a stack of currency bills and at least one storage receptacle for holding the deposited currency bills. A second scanner is included and obtains an image of a portion of the deposited currency bill in order to denominate the deposited currency bill. The deposited currency bills are transported from the input receptacle, past the second scanner, and to the storage receptacle by a depositing transport mechanism.

Alternate Embodiment E

In this embodiment, a currency dispensing and accepting system that is designed to denominate currency bills being dispensed and accepted comprises a plurality of dispensing receptacles, each of the dispensing receptacles holding a plurality of currency bills. Each of the dispensing receptacles holds bills having the same denomination, such that different dispensing receptacles hold bills having different denominations. A dispensed bill output receptacle receives dispensed currency bills from the dispensing receptacle via a transport mechanism. An image scanner obtains images of the dispensed currency bills to denominate the currency bills and is located along the transport mechanism. A bill accepting receptacle is also included and receives a stack of currency bills to be accepted into the system. The transport mechanism also transports currency bills from the bill accepting receptacle from the bill accepting receptacle past the image scanner, such that the accepted currency bills are also denominated.

Alternate Embodiment F

This embodiment includes a document processing system for processing currency bills to be withdrawn from a financial account and documents to be deposited into the financial account, the documents include currency bills and checks. The document processing system comprises a currency bill dispenser and a deposit device. The currency bill dispenser includes a plurality of dispensing receptacles. Each of the dispensing receptacles holds a plurality of currency bills, such that each of the dispensing receptacles holds one denomination of currency bill. An output receptacle is also included in the currency bill dispenser and receives the dispensed currency bills. The currency bills are denominated by a first denominator, which is located along a transport mechanism. The transport mechanism transports the dispensed currency bills, one by one, from the dispensing receptacles, past the first denominator and to the output receptacle.

The deposit device includes an input receptacle that receives a stack of documents, including currency bills and checks. A storage receptacle is included that holds the deposited currency bills and checks. The deposited currency bills are denominated by a second denominator and the deposited checks are imaged by an image scanner, which obtains full images of the checks. A depositing transport mechanism transports the deposited currency bills, one by one, from the input receptacle, past the second denominator and to the storage receptacle. Furthermore, The depositing transport mechanism transports the deposited checks from the input receptacle, past the image scanner and to the storage receptacle.

Alternative Embodiment G

This embodiment is of a document processing system for processing currency bills to be withdrawn from a financial account and documents to be deposited into the financial account, the documents including currency bills and financial institution documents. The system comprises a currency bill dispenser that includes a plurality of dispensing receptacles. Each of the dispensing receptacles is adapted to hold a plurality of currency bills, such that each of the dispensing receptacles holds one denomination of currency bill. The currency bill dispenser also includes an output receptacle for receiving the currency bills and a first scanner for obtaining an image of a portion of a currency bill being dispensed and for denominating the dispensed currency bill. The dispensed currency bills are transported from the plurality of dispensing receptacles, past the first scanner, and to the output receptacle by a dispensing transport mechanism.

The document processing system also comprises a deposit device, which includes an input receptacle for receiving a stack of documents, including both checks and currency bills. A storage receptacle is also included in the deposit device and holds the plurality of deposited documents. Full images of the deposited documents are obtained by an image scanner. The documents are transported from the input receptacle, past the image scanner, and to the storage receptacle by a depositing transport mechanism.

Alternative Embodiment H

In this embodiment, a document processing system for processing currency bills to be withdrawn from a financial account and documents to be deposited into the financial account, comprises a currency bill dispenser, a deposit device, and a processor. The currency bill dispenser includes a plurality of dispensing receptacles, an output receptacle, a first scanner, and a dispensing transport mechanism. Each of the plurality of dispensing receptacles holds a plurality of currency bills, such that each of the dispensing receptacles holds one denomination of currency bill. The first scanner obtains an image of a portion of a currency bill being dispensed and denominates the dispensed currency bill. The output receptacle receives the dispensed currency bills, after scanning. The transport mechanism transports the dispensed currency bill from one of the plurality of dispensing receptacles, past the first scanner and to the output receptacle.

The deposit device includes an input receptacle for receiving a stack of documents, wherein the documents include currency bills and checks. At least one storage receptacle is also included and is adapted to hold a plurality of currency bills and checks. The deposit device further has a second scanner that obtains an image of a portion of a currency bill being deposited, and thus denominates the currency bill. The second scanner authenticates the currency bill being deposited, any currency bills failing an authentication test being referred to as suspect bills. Full images are then taken of the suspect bills by an image scanner. The image scanner also obtains images of the deposited checks. A depositing transport mechanism is also included and transports deposited currency bills, one by one, form the input receptacle, past the second scanner, past the image scanner and to the storage receptacle. Deposited checks are transported by the transport mechanism from the input receptacle, past the image scanner, and to the storage receptacle.

The processor is in communication with the first scanner, the second scanner, and the image scanner. The processor: instructs the second scanner to scan the deposited currency bills; causes the image scanner to not obtain images of deposited currency bills that are determined to be authentic; and causes the image scanner to obtain images of suspect currency bills. The system of the present embodiment processes authenticated currency bills at a first rate and checks and suspect bills at a second, slower rate.

Alternate Embodiment I

Another embodiment is a method for processing a withdrawal request using a dispensing device, comprising receiving customer identification information into an entry device. Next, the system receives the withdrawal request into the entry device. Then, the system dispenses currency bills corresponding to the withdrawal request by transmitting the currency bills from a currency bill. Dispenser, past a scanner, and to an output receptacle. After scanning the currency bills as the currency bills are transmitted past the scanner to obtain the denomination of the dispensed currency bills, the system links the denomination of the dispensed currency bills to the customer's identification information.

Alternative Embodiment J

This embodiment is a method of updating a financial account belonging to a customer, comprising accepting a customer identification number relating a customer to a particular financial institution account and accepting transaction information. The transaction information includes a withdrawal request having a withdrawal amount and a deposit request having a deposit amount. Documents are then accepted into a scanning device, which scans the document to obtain a value of the documents deposited through the use of a sensor in the scanning device. A number of currency bills associated with the withdrawal request are then dispensed to an output receptacle. Each of the deposited documents are then associated with the financial institution account related to the customer identification number, as is the deposit and withdrawal requests. The system then stores the value of the scanned documents, the deposit and withdrawal amounts, and the customer identification number in a memory. The deposit and withdrawal amounts are transmitted to an accounting system associated with the financial institution account, which is then credited for the deposit amount and debited with the withdrawal amount.

Alternative Embodiment K

Another embodiment is a method for processing a transaction utilizing a document scanner, the transaction relating to a financial account associated with a customer, comprising receiving customer identification information into an entry device. A transaction request is received into the entry device, and the transaction request includes at least one of a declared deposit amount and a declared withdrawal amount. The deposit amount is transmitted to a processor. The document scanner then receives a plurality of documents to be deposited and transports the deposited documents, one by one, past an image scanner. The image scanner obtains an image of each of the deposited documents and a transaction amount for each of the deposited documents is obtained. The transaction amounts of the deposited documents are then summed, which is then compared to the declared deposit amount.

The withdrawal amount is transmitted to the processor, which disburses currency bills from a plurality of dispensing receptacles to a transport mechanism. The transport mechanism transmits the currency bills from the dispensing receptacles and to an output receptacle. The disbursed currency bills are then counted and denominated. The number and denomination of the currency bills disbursed are then compared to the declared withdrawal amount. A receipt is printed that summarizes the transaction.

The customer identification number is associated with the deposit and withdrawal amounts. The system then stores the images of the scanned currency bills, the deposit and withdrawal amounts, and the customer identification number in a memory.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A method of depositing and dispensing currency using a desktop document denominating and currency dispensing device comprising an input receptacle, a transport path, a single output receptacle, an image scanner, a processor, a controller, an interface, and one or more dispensing receptacles comprising the acts of:

receiving a stack of documents including U.S. bills having at least one of a plurality of U.S. bill denominations to be deposited in the input receptacle of the device;

transporting the documents received, one at a time, from the input receptacle along the transport path at a rate of at least 400 documents per minute;

scanning the documents with the image scanner;

generating image data output signals in response to information scanned on the documents;

receiving image data output signals with the processor;

determining the document type and value with the controller based on the image data output signals;

delivering the documents received to a single output receptacle;

removing the documents from the single output receptacle;

inputting a withdrawal request into the processor via the interface;

dispensing at least one U.S. bill having at least one of a plurality of U.S. bill denominations to be dispensed to satisfy the withdrawal request from the one or more dispensing receptacles, each receptacle adapted to hold a plurality of currency bills having the same denomination;

transporting the at least one bill dispensed from the one or more dispensing receptacles along the transport path;

determining the denomination of the at least one U.S. bill dispensed at a rate in excess of at least 400 bills per minute;

delivering to the single output receptacle the at least one U.S. bill dispensed; and using the image data output signals for OCR.

2. A method of depositing and dispensing currency using a desktop document denominating and currency dispensing device comprising an input receptacle, a transport path, a single output receptacle, an image scanner, a processor, a controller, an interface, and one or more dispensing receptacles comprising the acts of:

receiving a stack of documents including U.S. bills having at least one of a plurality of U.S. bill denominations to be deposited in the input receptacle of the device;

transporting the documents received, one at a time, from the input receptacle along the transport path at a rate of at least 400 documents per minute;

scanning the documents with the image scanner;

generating image data output signals in response to information scanned on the documents;

receiving image data output signals with the processor;

determining the document type and value with the controller based on the image data output signals;

delivering the documents received to a single output receptacle;

removing the documents from the single output receptacle;

inputting a withdrawal request into the processor via the interface;

dispensing at least one U.S. bill having at least one of a plurality of U.S. bill denominations to be dispensed to satisfy the withdrawal request from the one or more dispensing receptacles, each receptacle adapted to hold a plurality of currency bills having the same denomination;

transporting the at least one bill dispensed from the one or more dispensing receptacles along the transport path;

determining the denomination of the at least one U.S. bill dispensed at a rate in excess of at least 400 bills per minute;

delivering to the single output receptacle the at least one U.S. bill dispensed; and using the image data output signals for ICR.

3. A method of depositing and dispensing currency using a desktop document denominating and currency dispensing device comprising an input receptacle, a transport path, a single output receptacle, an image scanner, a processor, a controller, an interface, and a single set of a plurality of dispensing receptacles comprising the acts of:

receiving a stack of documents including U.S. bills having at least one of a plurality of U.S. bill denominations to be deposited in the input receptacle of the device;

transporting the documents received, one at a time, from the input receptacle along the transport path at a rate of at least 400 documents per minute;

scanning the documents with the image scanner;

generating image data output signals in response to information scanned on the documents;

receiving image data output signals with the processor;

determining the document type and value with the controller based on the image data output signals;

delivering the documents received to a single output receptacle;

manually removing the documents from the single output receptacle;

inputting a withdrawal request into the processor via the interface;

dispensing at least one U.S. bill having at least one of a plurality of U.S. bill denominations to be dispensed to satisfy the withdrawal request from the dispensing receptacles, each dispensing receptacle adapted to hold a plurality of currency bills having the same denomination, and each dispensing receptacle being vertically arranged with respect to each of the other dispensing receptacles;

transporting the at least one bill dispensed from the one or more dispensing receptacles along the transport path;

determining the denomination of the at least one U.S. bill dispensed at a rate in excess of at least 400 bills per minute; and delivering to the single output receptacle the at least one U.S. bill dispensed, wherein the act of receiving a stack of documents includes receiving some documents bearing a barcode, and further comprising using the image data output signals for reading a bar code on the documents.

* * * * *

UNITED STATES PATENT AND TRADEMARK OFFICE

CERTIFICATE OF CORRECTION

PATENT NO. : 7,635,082 B2
APPLICATION NO. : 10/773827
DATED : December 22, 2009
INVENTOR(S) : John E. Jones It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1658 days.

Signed and Sealed this

Ninth Day of November, 2010

David J. Kappos
*Director of the United States Patent and Trademark Office*